US012176603B2

(12) United States Patent
Yun et al.

(10) Patent No.: US 12,176,603 B2
(45) Date of Patent: Dec. 24, 2024

(54) ELECTRONIC DEVICE COMPRISING ANTENNA

(71) Applicant: SAMSUNG ELECTRONICS CO., LTD., Suwon-si (KR)

(72) Inventors: Sumin Yun, Suwon-si (KR); Kookjoo Lee, Suwon-si (KR); Minwoo Lee, Suwon-si (KR); Juseok Lee, Suwon-si (KR); Wonhee Choe, Suwon-si (KR); Hosaeng Kim, Suwon-si (KR); Jinwoo Jung, Suwon-si (KR); Jaebong Chun, Suwon-si (KR); Hochul Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 98 days.

(21) Appl. No.: 18/061,665

(22) Filed: Dec. 5, 2022

(65) Prior Publication Data

US 2023/0102743 A1 Mar. 30, 2023

Related U.S. Application Data

(63) Continuation of application No. PCT/KR2021/006849, filed on Jun. 2, 2021.

(30) Foreign Application Priority Data

Jun. 5, 2020 (KR) ........................ 10-2020-0068668

(51) Int. Cl.

*H01Q 1/46* (2006.01)
*H01Q 1/24* (2006.01)
*H01Q 1/38* (2006.01)

(52) U.S. Cl.

CPC ............... *H01Q 1/243* (2013.01); *H01Q 1/24* (2013.01); *H01Q 1/38* (2013.01); *H01Q 1/46* (2013.01)

(58) Field of Classification Search

CPC ............ H01Q 1/243; H01Q 1/24; H01Q 1/46; H01Q 1/38

See application file for complete search history.

(56) References Cited

U.S. PATENT DOCUMENTS 9,715,290 B2 7/2017 Kim et al.
10,326,196 B2 6/2019 Kim et al.
(Continued)

FOREIGN PATENT DOCUMENTS

CN 107394337 11/2017
EP 0 911 906 4/1999
(Continued)

OTHER PUBLICATIONS

Extended European Search Report dated Oct. 23, 2023 for EP Application No. 21818208.7.
(Continued)

*Primary Examiner* — Hai V Tran
(74) *Attorney, Agent, or Firm* — Nixon & Vanderhye P.C.

(57) ABSTRACT

An electronic device may include a display panel, a conductive pattern panel disposed on the display panel, an antenna pattern formed in a second region of the conductive pattern panel, a first dummy pattern including a plurality of conductive lines, a wireless communication circuit electrically connected to the antenna pattern, and at least one processor electrically connected to the display panel, the conductive pattern panel, and the wireless communication circuit, and the at least one processor may be configured to receive a radio frequency (RF) signal at least by using the antenna pattern and/or the wireless communication circuit.

20 Claims, 23 Drawing Sheets

(56) References Cited

U.S. PATENT DOCUMENTS

| | | | | |
|---|---|---|---|---|
| 10,551,949 | B2 | 2/2020 | Chai et al. | |
| 10,985,450 | B2 | 4/2021 | Yamagishi et al. | |
| 11,139,555 | B2 | 10/2021 | Choi et al. | |
| 2009/0231203 | A1 | 9/2009 | Ficker et al. | |
| 2015/0061942 | A1* | 3/2015 | Koyama | H05K 3/143 174/253 |
| 2015/0255856 | A1* | 9/2015 | Hong | H01Q 21/061 343/702 |
| 2016/0190678 | A1* | 6/2016 | Hong | H01Q 1/364 343/700 MS |
| 2017/0025887 | A1* | 1/2017 | Hyun | H02J 50/90 |
| 2017/0083153 | A1 | 3/2017 | Yeh et al. | |
| 2017/0139520 | A1 | 5/2017 | Yeh et al. | |
| 2017/0269440 | A1* | 9/2017 | Yoshitomi | G06F 3/0446 |
| 2018/0286924 | A1* | 10/2018 | Lee | G06F 1/1626 |
| 2019/0361549 | A1 | 11/2019 | Gu | |
| 2020/0067176 | A1 | 2/2020 | Kim et al. | |
| 2020/0194896 | A1* | 6/2020 | Huh | H01Q 1/48 |
| 2020/0251813 | A1* | 8/2020 | Ryu | H01Q 1/38 |
| 2020/0259246 | A1* | 8/2020 | Kim | H01Q 21/28 |

FOREIGN PATENT DOCUMENTS

| | | |
|---|---|---|
| JP | 2019-53343 | 4/2019 |
| KR | 10-1393249 | 4/2014 |
| KR | 10-2015-0104509 | 9/2015 |
| KR | 10-2016-0036436 | 4/2016 |
| KR | 2018-0043429 | 4/2018 |
| KR | 10-1967771 | 4/2019 |
| KR | 10-1973742 | 4/2019 |
| KR | 10-2019-0090226 | 8/2019 |
| KR | 10-2028352 | 10/2019 |

OTHER PUBLICATIONS

International Search Report for PCT/KR2021/006849 mailed Sep. 17, 2021, 5 pages.

Written Opinion of the ISA for PCT/KR2021/006849 mailed Sep. 17, 2021, 3 pages.

Korean Office Action dated May 16, 2024 for KR Application No. 10-2020-0068668.

Korean Notice of Patent Grant dated Oct. 24, 2024 for KR Application No. 10-2020-0068668.

* cited by examiner

1101

ELECTRONIC DEVICE COMPRISING ANTENNA

CROSS-REFERENCE TO RELATED APPLICATIONS

This application is a continuation of International Application No. PCT/KR2021/006849 filed on Jun. 2, 2021, designating the United States, in the Korean Intellectual Property Receiving Office, and claiming priority to KR 10-2020-0068668, filed on Jun. 5, 2020, the disclosures of which are all hereby incorporated by reference herein in their entireties.

BACKGROUND

Field

The disclosure relates to an electronic device including an antenna.

Description of Related Art

Due to rapid increase in mobile traffic, next generation communication (e.g., $5^{th}$ generation (5G)) technology based on a high bandwidth frequency is developed. For example, a high-band frequency signal may include a millimeter wave (mmWave) having a frequency bandwidth of 20 gigahertz (GHz) through 300 GHz.

An electronic device for the next generation communication may include an array antenna for increasing an antenna gain, to overcome free space propagation loss.

SUMMARY

A conductive member and a display included in a housing of an electronic device may degrade radiation performance of a high-bandwidth signal having high directivity. For example, to improve the radiation performance, if thickness of a conductive side member included in the housing of the electronic device is reduced in part, design competitiveness may be lowered, and a risk of damage due to external impact may increase.

As another example, if the electronic device uses the conductive member included in the housing as a radiator of an array antenna, it may be difficult to mount a power feeding structure in the electronic device, due to a relatively considerable size of the power feeding structure.

Various embodiments may provide an electronic device for transmitting and receiving a wireless communication signal through a conductive pattern panel.

An electronic device according to an example embodiment may include a display panel, a conductive pattern panel disposed on the display panel—the conductive pattern panel including a dielectric layer, a first conductive pattern disposed on a first surface of the dielectric layer, and including a plurality of first conductive members comprising conductive material, and a second conductive pattern disposed on a second surface opposite to the first surface of the dielectric layer, and including a plurality of second conductive members comprising conductive material, wherein the conductive pattern panel includes a first region and a second region, and the first conductive pattern and the second conductive pattern are disposed in the first region, an antenna pattern formed at least partially in the second region of the conductive pattern panel, the antenna pattern including at least one first conductive line disposed to be substantially parallel to the plurality of the first conductive members of the first conductive pattern on the first surface of the dielectric layer, at least one second conductive line disposed to be substantially parallel to the plurality of the second conductive members of the second conductive pattern on the second surface of the dielectric layer, and at least one conductive via electrically connecting the at least one first conductive line and the at least one second conductive line and passing through the dielectric layer, a first dummy pattern including a plurality of conductive lines, the first dummy pattern being disposed on the first surface of the dielectric layer, disposed between the at least one first conductive line and the plurality of the first conductive members, and substantially parallel to the plurality of the second conductive members, a wireless communication circuit electrically connected to the antenna pattern, and at least one processor electrically connected to the display panel, the conductive pattern panel, and the wireless communication circuit, and the at least one processor may be configured to receive a radio frequency (RF) signal using at least the antenna pattern and the wireless communication circuit.

An electronic device according to an example embodiment may include a display panel, a conductive pattern panel disposed on the display panel—the conductive pattern panel including a dielectric layer, a first conductive pattern including a plurality of first conductive members disposed on a first surface of the dielectric layer, and a second conductive pattern including a plurality of second conductive members disposed on a second surface opposite to the first surface of the dielectric layer, and the conductive pattern panel including a designated region in which the first conductive pattern and the second conductive pattern are not disposed—, an antenna pattern formed in the designated region of the conductive pattern panel—the antenna pattern including at least one first conductive line disposed to be substantially parallel to the plurality of the first conductive members on the second surface of the dielectric layer, and at least one second conductive line disposed to be substantially parallel to the plurality of the second conductive members on the second surface of the dielectric layer—, an RF integrated circuit (RFIC) electrically connected to the antenna pattern, and at least one processor electrically connected to the display panel, the conductive pattern panel, and the RFIC, and the at least one processor may be configured to receive a mmWave signal using at least the antenna pattern and the RFIC.

By implementing a conductive pattern panel and an antenna pattern according to an example embodiment, an electrode pattern of the conductive pattern panel and/or the antenna pattern may not be visible to a user from outside of an electronic device.

By implementing the antenna pattern on the conductive pattern panel of the electronic device according to an example embodiment, thickness of the electronic device may be reduced.

The electronic device according to an example embodiment may concurrently detect a touch input and transmit and receive a radio frequency (RF) signal, at least by implementing the antenna pattern on the conductive pattern panel.

By implementing the antenna pattern on the conductive pattern panel of the electronic device according to an example embodiment, wireless communication coverage of the electronic device may be improved.

BRIEF DESCRIPTION OF DRAWINGS

The above and other aspects, features, and advantages of certain example embodiments will be more apparent from the following detailed description, taken in conjunction with the accompanying drawings, in which.

DETAILED DESCRIPTION

Figure 1:
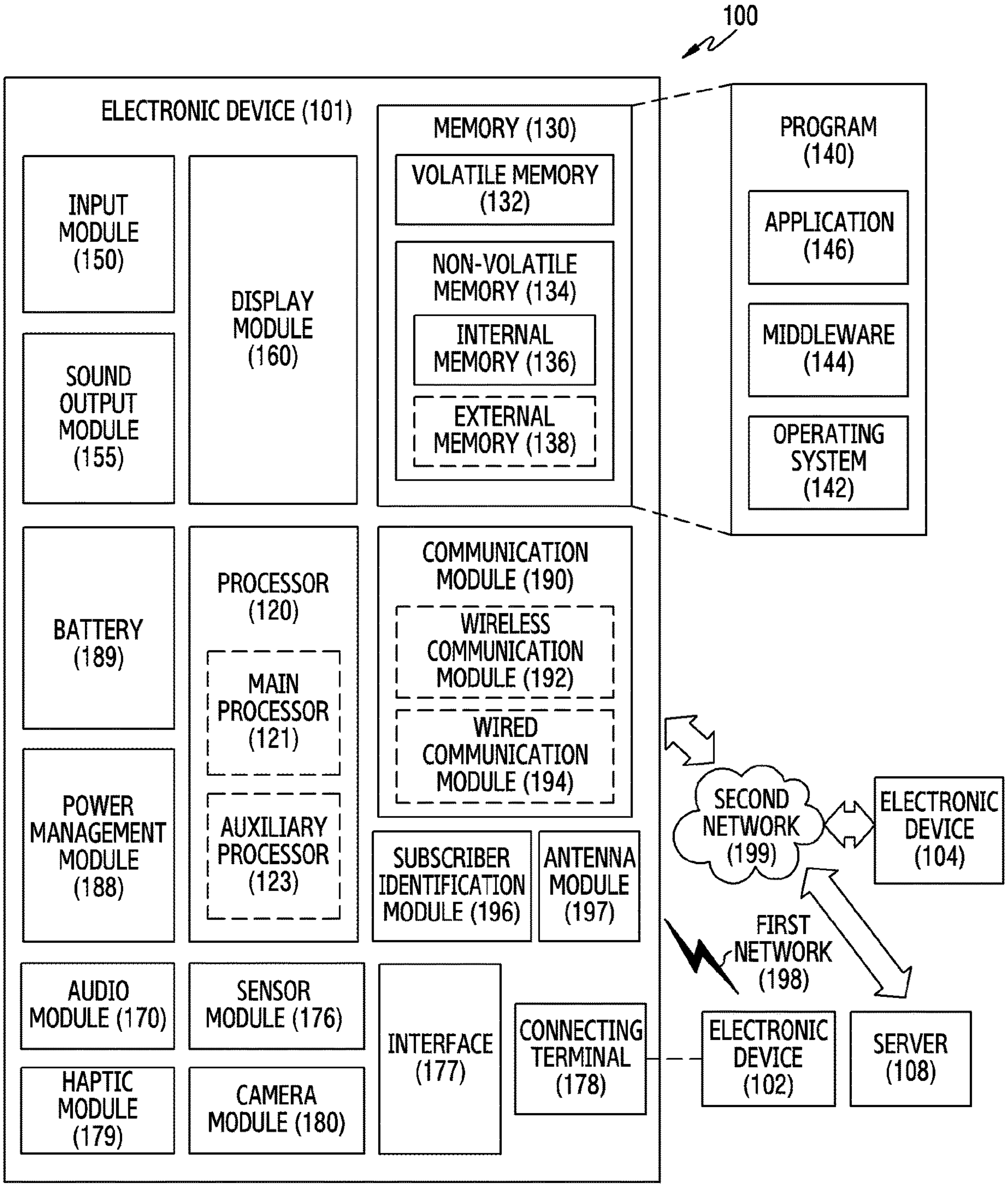
FIG. 1 is a block diagram of an electronic device in a network environment, according to various example embodiments.

FIG. 1 is a block diagram illustrating an electronic device 101 in a network environment 100 according to various example embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled, directly or indirectly, with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190, comprising communication circuitry, may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192, comprising communication circuitry, may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197. According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via at least a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC). Thus, any "module" herein may comprise circuitry.

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2A:
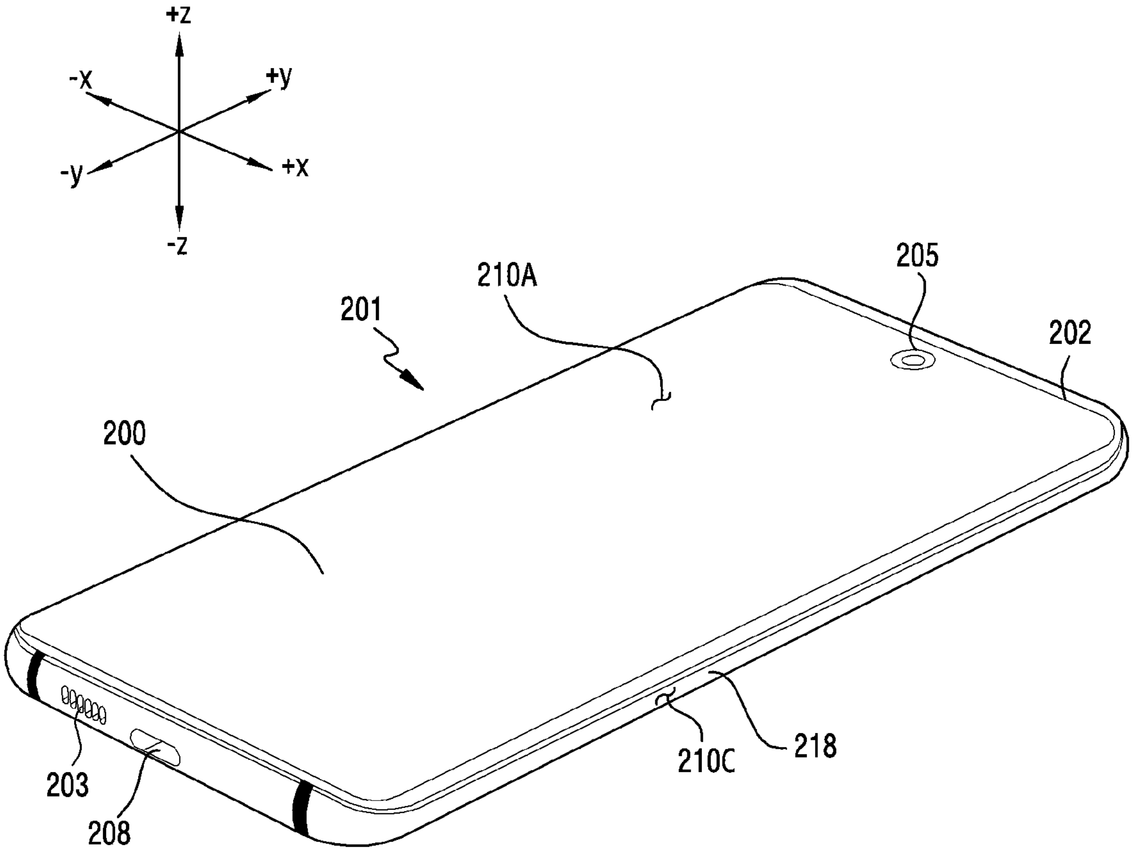
FIG. 2A is a perspective view illustrating a front surface of an electronic device according to an example embodiment.
Figure 2B:
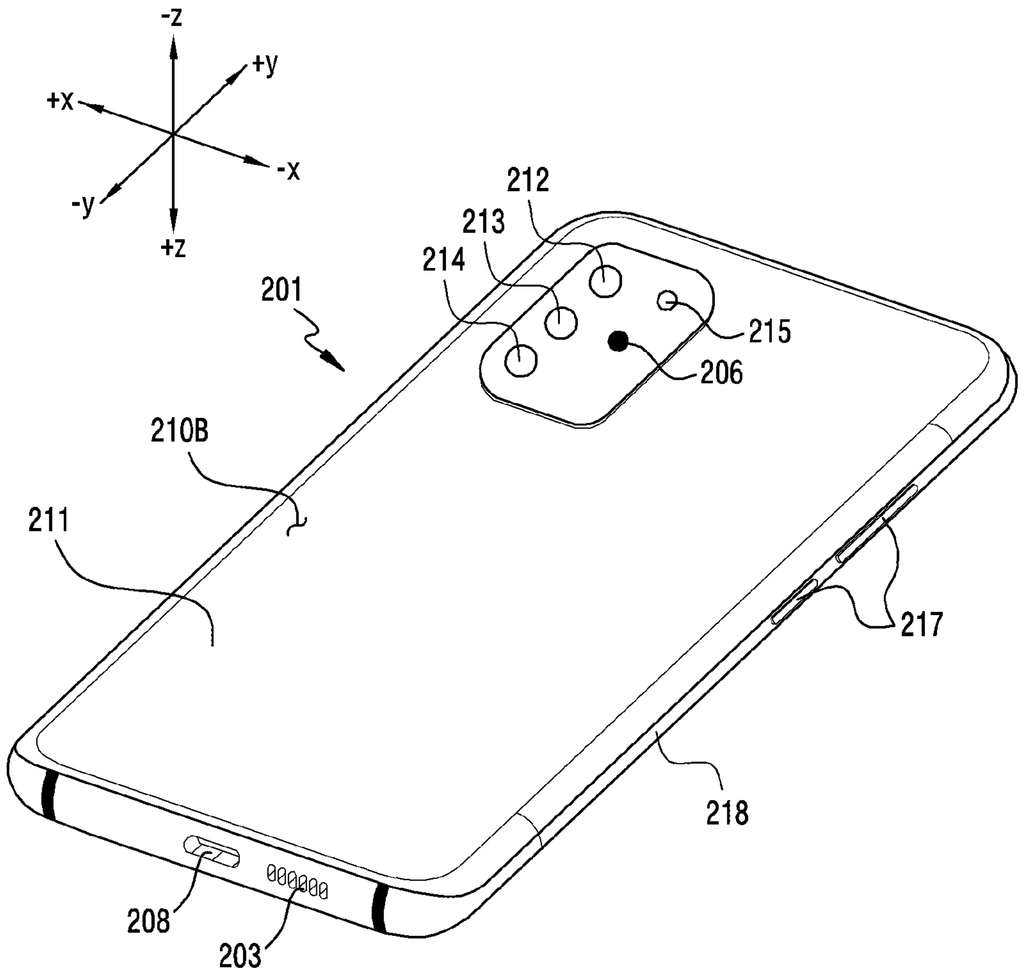
FIG. 2B is a perspective view illustrating a rear surface of an electronic device of FIG. 2A.

FIG. 2A is a perspective view illustrating a front surface of an electronic device according to an embodiment, and FIG. 2B is a perspective view illustrating a rear surface of the electronic device of FIG. 2A.

Referring to FIGS. 2A and 2B, an electronic device 201 (e.g., the electronic device 101 of FIG. 1) according to an embodiment may include a housing 210 including a first surface (or a "front surface") 210A, a second surface (or a "rear surface") 210B, and a side surface (or a "sidewall") 210C which surrounds a space between the first surface 210A and the second surface 210B. In an embodiment, the housing 210 may indicate a structure forming a part of the first surface 210A, the second surface 210B, and the side surfaces 210C of FIGS. 2A and 2B.

According to an embodiment, the first surface 210A may be formed by a front plate 202 (e.g., a glass plate including various coating layers, or a polymer plate) which is at least in part transparent. According to an embodiment, the front plate 202 may include a curved portion seamlessly extending from the first surface 210A toward a rear plate 211 in at least one side edge portion.

According to an embodiment, the second surface 210B may be formed by the substantially opaque rear plate 211. The rear plate 211 may be formed by, for example, coated or tinted glass, ceramic, polymer, metal (e.g., aluminum, stainless steel (STS), or magnesium), or a combination of at least two of the materials. According to an embodiment, the rear plate 211 may include a curved portion seamlessly extending from the second surface 210B toward the front plate 202 in at least one side edge portion.

According to an embodiment, the side surface 210C may be formed by a side member (or a "bracket") 218 which couples with the front plate 202 and the rear plate 211, and includes a metal and/or polymer. In some embodiment, the rear plate 211 and the side member 218 may be integrally formed and include the same material (e.g., a metal material such as aluminum).

According to an embodiment, the electronic device 201 may include at least one or more of a display 200, an audio module 203, a sensor module (not shown), at least one camera module 205, 212, 213, and 206, a key input device 217 and a connector hole 208. In some embodiment, the electronic device 201 may omit at least one (e.g., the key input device 217) of the components or may additionally include other component. For example, the electronic device 201 may additionally include a sensor module. For example, a sensor such as a proximity sensor or an illuminance sensor may be integrated into the display 200 in a region provided by the front plate 202, or may be disposed adjacent to the display 200. In some embodiment, the electronic device 201 may further include a light emitting device, and the light emitting device may be disposed at a position adjacent to the display 200 in a region provided by the front plate 202. The light emitting device may provide, for example, state information of the electronic device 201 in the form of light. In an embodiment, the light emitting device may provide, for example, a light source interworking with an operation of the camera module 205. The light emitting element may include, for example, a light emitting diode (LED), an infrared (IR) LED, and a xenon lamp.

The display 200 may be visible from outside of the electronic device 201 through, for example, a substantial portion of the front plate 202. In some embodiment, the edge of the display 200 may be formed to be substantially the same as an adjacent outer shape (e.g., a curved surface) of the front plate 202. In an embodiment, to expand an area exposing the display 200, a spacing between a periphery of the display 200 and a periphery of the front plate 202 may be substantially identical. In an embodiment (not shown), a recess or an opening may be formed in a part of a screen display region of the display 200, to include other electronic component aligned with the recess or the opening, for example, the camera module 205, the proximity sensor or the illuminance sensor (not shown).

In an embodiment, at least one or more of the at least one camera module (e.g., 212, 213, 214, 215), a fingerprint sensor, and a flash (e.g., 206) may be included in a rear surface of the screen display region of the display 200. In an embodiment, the display 200 may be coupled with or disposed adjacent to a touch sensing circuit, a pressure sensor for measuring touch intensity (pressure), and/or a digitizer for detecting a magnetic field type stylus pen.

The audio module 203 may include a microphone hole and a speaker hole. In the microphone hole, a microphone for acquiring an external sound may be disposed therein, and a plurality of microphones may be disposed to detect a direction of the sound in some embodiment. In some embodiment, the speaker hole and the microphone hole may be implemented as a single hole (e.g., the audio module 203), or a speaker may be included without the speaker hole (e.g., a piezo speaker). The speaker hole may include an external speaker hole and a call receiver hole.

The electronic device 201, including the sensor module which is not shown, may generate an electrical signal or a data value corresponding to an internal operating state or an external environmental state. The sensor module may further include, for example, the proximity sensor disposed in the first surface 210A of the housing 210, the fingerprint sensor integrated into or disposed adjacent to the display 200, and/or a biometric sensor (e.g., a heart rate monitor (HRM) sensor) disposed on the second surface 210B of the housing 210. The electronic device 201 may include a sensor module not shown, for example, at least one of a gesture sensor, a gyro sensor, a barometric pressure sensor, a magnetic sensor, an acceleration sensor, a grip sensor, a color sensor, an IR sensor, a biometric sensor, a temperature sensor, a humidity sensor, or an illuminance sensor.

The first camera device 205 of the at least one camera module 205, 212, 213, 214, 215, and 206 may be disposed in the first surface 210A of the electronic device 201, and the second camera device 212, 213, 214, and 215 and the flash 206 may be disposed in the second surface 210B of the electronic device 201. The at least one camera module 205, 212, 213, 214, and 215 described above may include one or a plurality of lenses, an image sensor, and/or an image signal processor. The flash 206 may include, for example, a light emitting diode or a xenon lamp. In some embodiment, two or more lenses (an infrared camera, wide angle and telephoto lenses) and image sensors may be disposed in one surface of the electronic device 201.

The key input device 217 may be disposed on the side surface 210C of the housing 210. In an embodiment, the electronic device 201 may not include part or whole of the above-mentioned key input device 217 and the key input device 217 not included may be displayed on the display 200 in a different form such as a soft key. In some embodiment, the key input device may include at least a part of the fingerprint sensor disposed in the second surface 210B of the housing 210.

The connector hole 208 may accommodate a connector for transmitting and receiving power and/or data to and from an external electronic device, and/or a connector for transmitting and receiving an audio signal to and from an external electronic device. For example, the connector hole 208 may include a universal serial bus (USB) connector or an earphone jack. In an embodiment, the USB connector and the earphone jack may be implemented as a single hole (e.g., 208 in FIG. 2A, FIG. 2B), and according to an embodiment, the electronic device 201 may transmit and receive power and/or data, or transmit and receive an audio signal to and from an external electronic device (e.g., the electronic devices 102, 104 of FIG. 1) without a separate connector hole.

Figure 3:
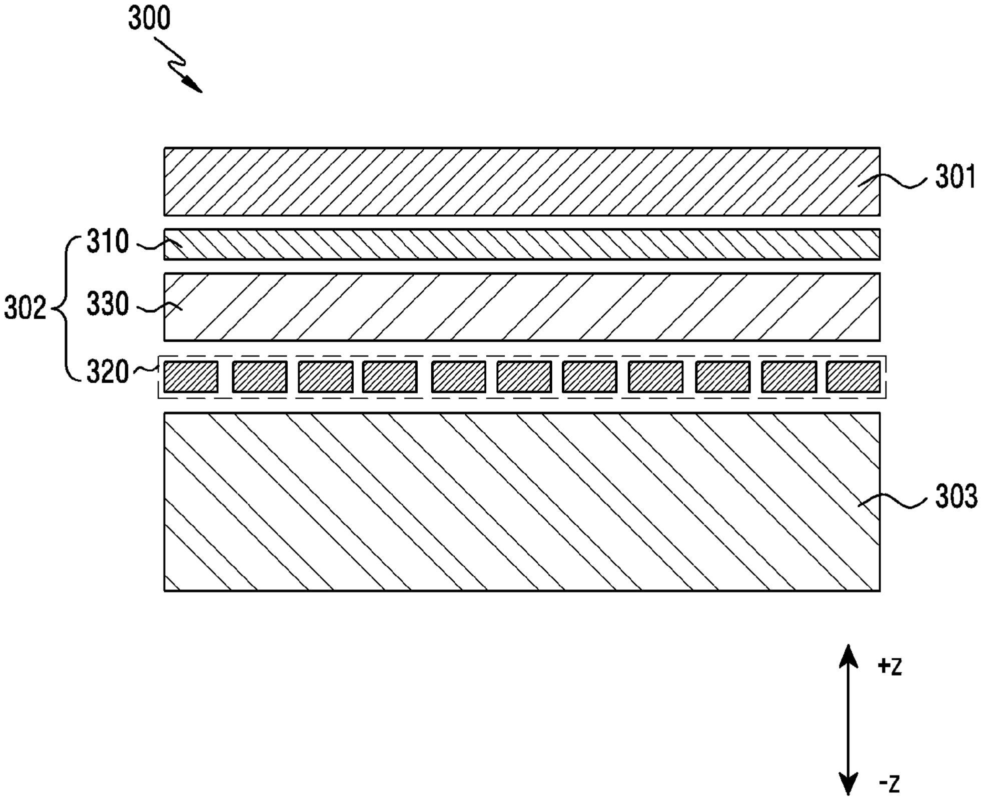
FIG. 3 illustrates a display of an electronic device according to an example embodiment.

FIG. 3 illustrates a display of an electronic device according to an embodiment.

Referring to FIG. 3, a display 300 (e.g., the display 200 of FIG. 2A) according to an embodiment may include at least one of a window 301, a conductive pattern panel 302, and/or a display panel 303.

The window 301 (e.g., the front plate 202 of FIG. 2A) according to an embodiment may be disposed on (e.g., the +z direction) the display panel 303. The window 301 may be formed to be substantially transparent, and light emitted from the display panel 303 may pass through the window 301 and be transmitted to outside of an electronic device 201. The window 301 may include, for example, glass and/or a polymer.

In an embodiment, the conductive pattern panel 302 may include a first pattern portion 310, a second pattern portion 320, and/or a dielectric layer 330. The term "dielectric layer" may be replaced by "nonconductive layer" or "layer comprising a dielectric material" in the disclosure.

In an embodiment, the dielectric layer 330 may be disposed between the first pattern portion 310 and the second pattern 320. The dielectric layer 330 may prevent or reduce the first pattern portion 310 and the second pattern portion 320 from electrically interfering with each other. In an embodiment, the dielectric layer 330 may include an insulating material. For example, the dielectric layer 330 may include any one or a combination of two or more selected from silicon, air, a membrane, a double-sided adhesive film, a pressure sensitive adhesive (PSA), an optically clear adhesive (OCA), optical clear resin (OCR), sponge, rubber, ink, acrylonitrile butadiene styrene (ABS), acrylic, polycarbonate (PC), polymethyl methacrylate (PMMA), polyimide (PE), polyethylene terephthalate (PET), polypropylene terephthalate (PPT), amorphous polyethylene terephthalate (APET), polyethylene naphthalate terephthalate, (PEN), polyethylene terephthalate glycol (PETG), tri-acetyl-cellulose (TAC), cycloolefin polymer (COP), cyclic olefin copolymer (COC), dicyclopentadiene polymer (DCPD), cyclopentdienyl anions (CPD), polyarylate (PAR), polyethersulfone (PES), polyether imide (PEI), a modified epoxy resin or an acrylic resin. The dielectric layer 330 may be transparent.

In an embodiment, the first pattern portion 310 and/or the second pattern portion 320 may include various conductive members. A designated pattern of the first pattern portion 310 and/or the second pattern portion 320 may be formed, by the conductive members. The conductive members may include various conductive materials. For example, the first pattern portion 310 and/or the second pattern portion 320 may include indium tin oxide (ITO), indium zinc oxide (IZO), copper oxide, Poly(3,4-ethylenedioxythiophene) (PEDOT), metal mesh, carbon nano tube (CNT), Ag nanowire, transparent polymer conductor or graphene. In an embodiment, the first pattern portion 310 and the second pattern portion 320 may include the same material. In an embodiment, the first pattern portion 310 and the second pattern portion 320 may include different materials. The term "conductive member" may be referred to a hardware component which comprising a conductive material. For example, the term "conductive member" may be replaced by "conductive material" in the disclosure.

In an embodiment, the first pattern portion 310 may be formed on a first surface (e.g., the first surface 430A of FIG.

4A) of the dielectric layer 330, and the second pattern portion 320 may be formed on a second surface (e.g., the second surface 430B of FIG. 4A) facing away from the first surface of the dielectric layer 330. In an embodiment, a designated pattern may be formed by the first pattern portion 310 and the second pattern portion 320. For example, when the conductive pattern panel 302 is viewed from above (e.g., viewed from the −z direction), a rectangular grid pattern (e.g., FIG. 4C) or a rhombus lattice pattern (or a mesh pattern) (e.g., FIG. 9C) may be formed by the first pattern portion 310 and the second pattern portion 320.

In an embodiment, at least a part of the first pattern portion 310 and/or the second pattern portion 320 may operate as a sensing pattern for sensing an input. For example, the first pattern portion 310 and/or the second pattern portion 320 may operate as a touch sensing pattern, or a pen sensing pattern. As another example, a part of the first pattern portion 310 and/or the second pattern portion 320 may operate as a sensing pattern, and the remaining part of the first pattern portion 310 and/or the second pattern portion 320 may be formed in a dummy pattern not electrically connected to other configuration. As another example, a part of the first pattern portion 310 and/or the second pattern portion 320 may operate as a sensing pattern, and the remaining part of the first pattern portion 310 and/or the second pattern portion 320 may operate as an antenna pattern. As another example, a part of the first pattern portion 310 and/or the second pattern portion 320 may be operated as a sensing pattern, and another part of the first pattern portion 310 and/or the second pattern portion 320 may be operated as an antenna pattern, and the remaining part of the first pattern portion 310 and/or the second pattern portion 320 may be formed in a dummy pattern.

In an embodiment, the sensing pattern of the first pattern portion 310 and the second pattern portion 320 may be configured to acquire information of a user's fingerprint contacting the display 300, as well as the touch input. In an embodiment, the conductive pattern panel 302 may be referred to as a touch panel 302, in detecting the user's touch and/or fingerprint, by use of at least a part of the first pattern portion 310 and/or the second pattern portion 320.

In an embodiment, a processor 120 (comprising processing circuitry) of the electronic device 201 may detect a touch input or a hovering input for a specific position of the display 300, using the conductive pattern panel 302. For example, the electronic device 201 may include a touch sensor integrated circuit (IC) (or control circuit) electrically connected, directly or indirectly, to at least a part of the first pattern portion 310 and the second pattern portion 320. For example, the processor 120 may apply a transmit signal to the first pattern portion 310 of the conductive pattern panel 302, and receive a receive signal corresponding to the transmit signal through the second pattern portion 320, using the touch sensor IC. The touch sensor IC may measure a change of a signal (e.g., voltage, light amount, resistance, electric charge, or capacitance) between the first pattern portion 310 and the second pattern portion 320, and thus detect a touch input or a hovering input of an external object. The touch sensor IC may provide information (e.g., a position, an area, a pressure, or time) of the detected touch input or hovering input to the processor 120. The first pattern portion 310 has been described as a transmission electrode, but it is not limited thereto and the second pattern portion 320 may be implemented as a transmission electrode.

In an embodiment, the display panel 303 may be disposed under the conductive pattern panel 302 (e.g., the −z direction).

In an embodiment, the display panel 303 may include a plurality of layers. For example, the plurality of the layers of the display panel 303 may include at least one of a cover panel (C-panel) for protecting the display panel 303, a base substrate, a thin film transistors (TFTs) layer formed on the base substrate, a pixel layer (or an organic light emitting layer) receiving a signal voltage from the TFT layer, thin film encapsulation (TFE) for preventing or reducing the pixel layer from being exposed to external air and moisture and/or a polarization layer disposed on the TFE (e.g., the +z direction). The polarization layer may improve clarity of an image displayed through the display panel 303, by providing directionality to light emitted from the display panel 303. In an embodiment, the base substrate may be formed of a polymer material (e.g., polyimide (PI), etc.) to attain flexibility of the substrate, but is not limited thereto. For example, the base substrate may include at least one of polyethylene terephthalate, polymethyl methacrylate, polyamide, polyimide, polypropylene or polyurethane.

The conductive pattern panel 302 according to an embodiment may be disposed between the window 301 and the display panel 303, but is not limited thereto, and various design changes may be made. For example, the conductive pattern panel 302 may be disposed on the TFE of the display panel 303, wherein the polarization layer of the display panel 303 may be disposed between the window 301 and the conductive pattern panel 302. As another example, the conductive pattern panel 302 may be disposed on the polarization layer of the display panel 303.

In an embodiment, the first pattern portion 310 and the second pattern portion 320 of the conductive pattern panel 302 may be formed by patterning both surfaces of the dielectric layer 330. In this case, the conductive pattern panel 302 may be attached to the window 301 and the display panel 303 through an optically transparent adhesive member (e.g., an optically clear adhesive). In an embodiment, the conductive pattern panel 302 may be formed by, for example, depositing on the TFE of the display panel 303. In this case, a separate adhesive member for attaching the conductive pattern panel 302 to the display panel 303 may be omitted. In an embodiment, the first pattern portion 310 and the second pattern portion 320 may be disposed on the same layer in the display 300. For example, the first conductive pattern 911 shown in FIG. 9A may be understood as at least a part of the first pattern portion 310 and/or the second pattern portion 320 disposed on a first surface 930A of a dielectric layer 930.

Figure 4A:
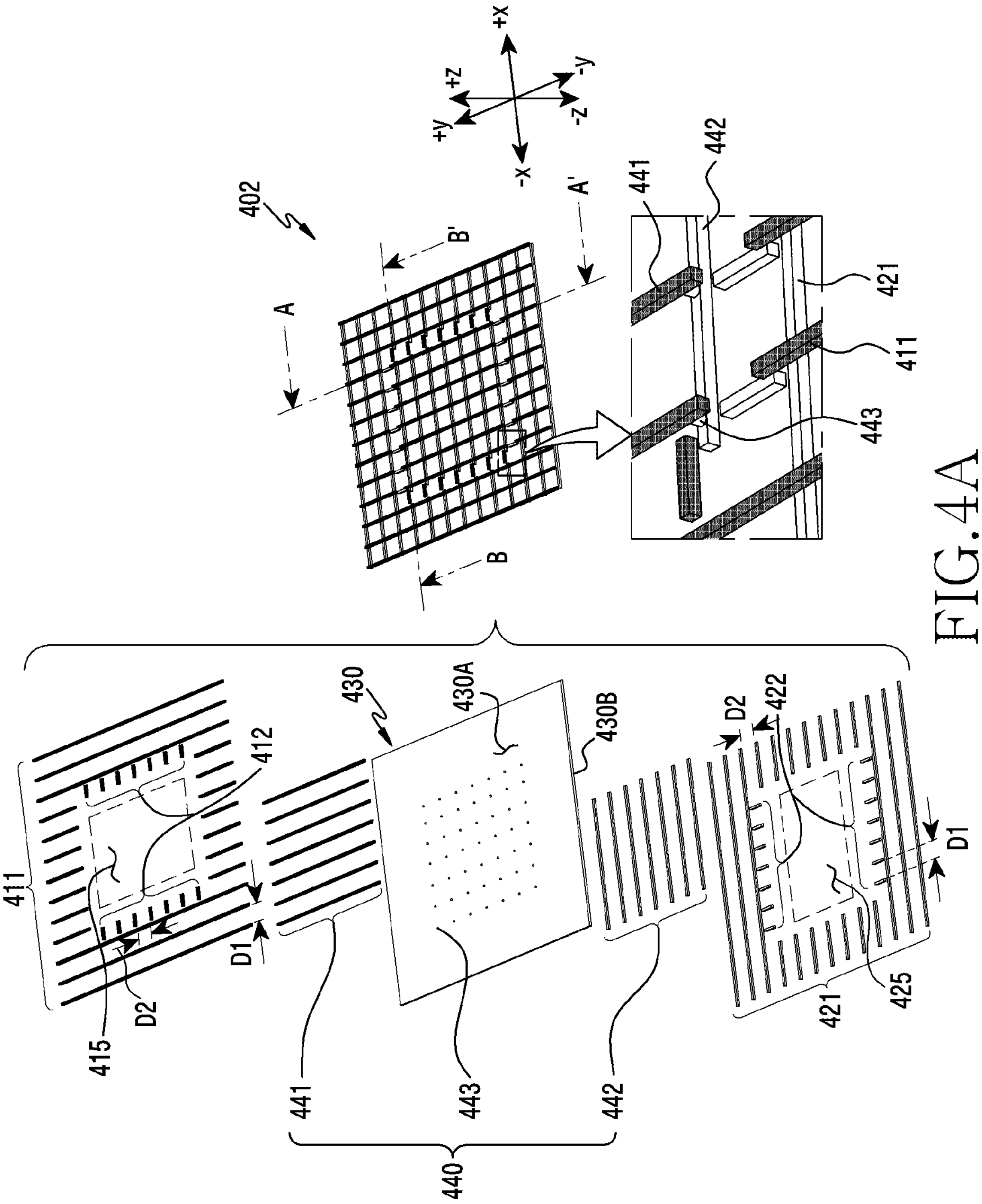
FIG. 4A illustrates a conductive pattern panel according to an example embodiment.

FIG. 4A illustrates a conductive pattern panel according to an embodiment.

Figure 4B:
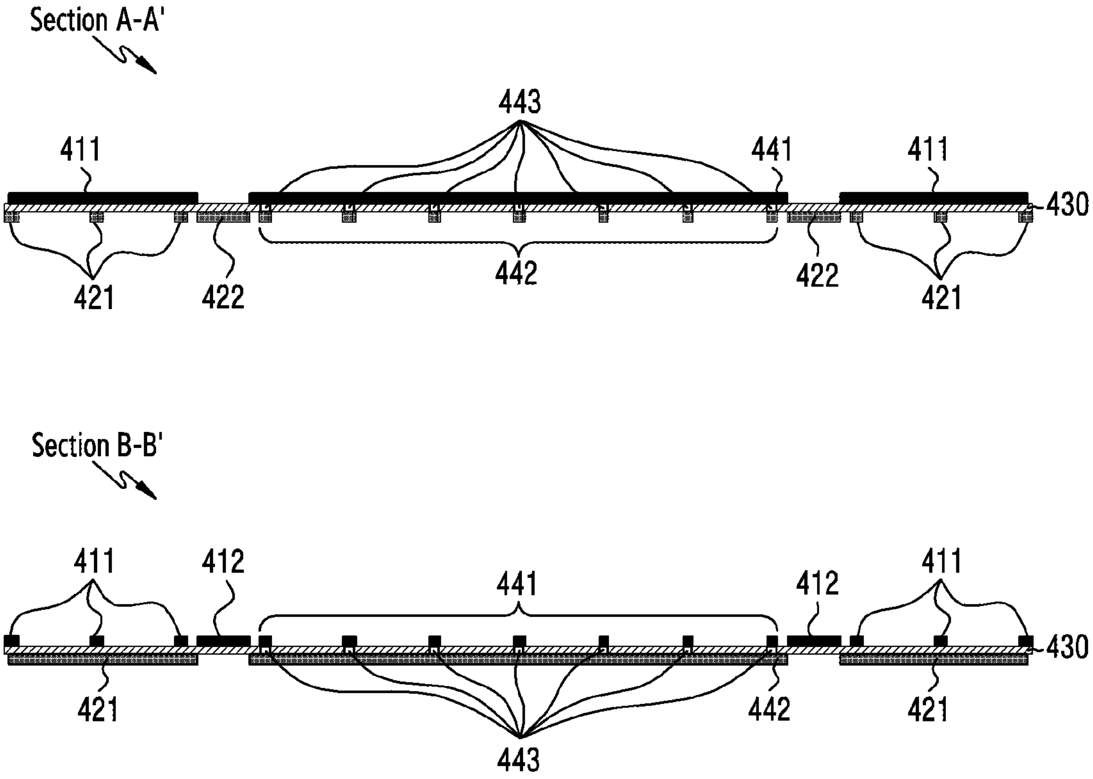
FIG. 4B illustrates a section A-A' and a section B-B' of FIG. 4A.

FIG. 4B illustrates a section A-A' and a section B-B' of FIG. 4A.

Figure 4C:
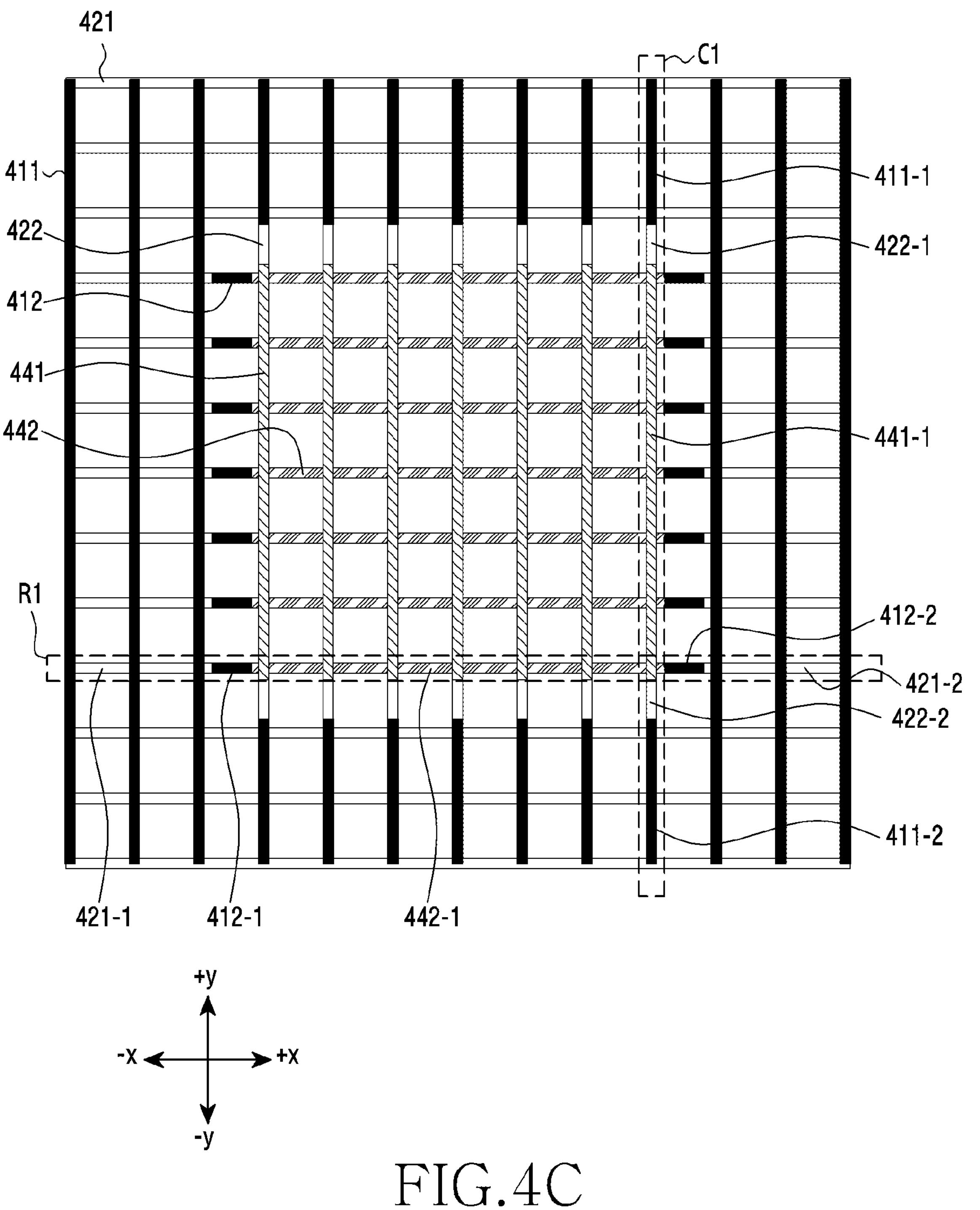
FIG. 4C is a plan view of a conductive pattern panel of FIG. 4A when viewed from the −z direction.

FIG. 4C is a plan view of the conductive pattern panel of FIG. 4A when viewed from the −z direction.

Figure 5:
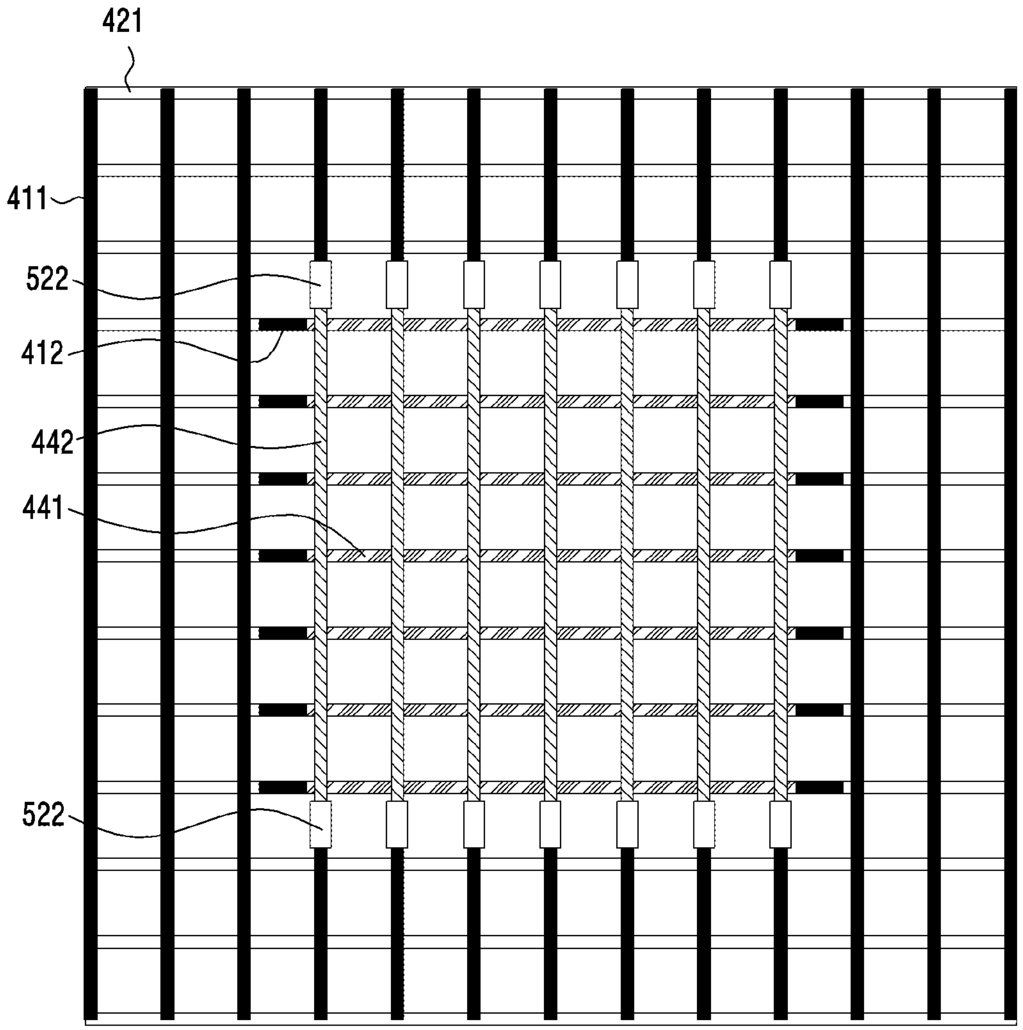
FIG. 5 illustrates a conductive pattern panel according to another example embodiment.

FIG. 5 illustrates a conductive pattern panel according to an embodiment.

Referring to FIG. 4A, FIG. 4B, and FIG. 4C, a conductive pattern panel 402 according to an embodiment may include at least one of a first conductive pattern 411, a first dummy pattern 412, an antenna pattern 440, a dielectric layer 430, a second conductive pattern 421, and/or a second dummy pattern 422.

The conductive pattern panel 402 of FIG. 4A through FIG. 5 may be an example of the conductive pattern panel 302 of FIG. 3. In an embodiment, the first conductive pattern 411, the first dummy pattern 412, and the at least one first conductive line 441 of the conductive pattern panel 402 may be included in the first pattern portion 310 of FIG. 3. In an embodiment, the second conductive pattern 421, the second dummy pattern 422, and the at least one second conductive line 442 of the conductive pattern panel 402 may be included in the second pattern portion 320 of FIG. 3. In an embodiment, the dielectric layer 430 of the conductive pattern panel 402 may be an example of the dielectric layer 330 of FIG. 3.

In an embodiment, the first conductive pattern 411 may include a plurality of electrodes formed on a first surface 430A of the dielectric layer 430. The first conductive pattern 411 may not be formed in a first designated region 415 of the conductive pattern panel 402. For example, a part of the first conductive pattern 411 may be separated based on the first designated region 415. A shape of the first designated region 415 may be a rectangle, but is not limited thereto. In an embodiment, the first conductive pattern 411 may extend in the y-axis direction, and may be arranged at first designated intervals D1 along the x-axis direction. In an embodiment, the first designated interval D1 may be greater than or equal to about 10 um and less than or equal to about 500 um.

In an embodiment, the first dummy pattern 412 may include a plurality of conductive lines. The first dummy pattern 412 may be disposed on, directly or indirectly, the first surface 430A of the dielectric layer 430. In an embodiment, the first dummy pattern 412 may be disposed around the first designated region 415. For example, the first dummy pattern 412 may be disposed along a first edge (e.g., an edge facing the −x direction) of the first designated region 415 and a second edge (e.g., an edge facing the +x direction) facing the first edge. For example, the first edge and the second edge may be edges substantially parallel to a direction in which the first conductive pattern 411 extends (e.g., y-axis direction).

In an embodiment, the first dummy pattern 412 may extend along the x-axis direction, and may be arranged at second designated intervals D2 along the y-axis direction. The second designated interval D2 may be, for example, substantially the same as or different from the first designated interval. In an embodiment, the extension direction of the first dummy pattern 412 may be substantially perpendicular to the first conductive pattern 411. The extension direction of the first dummy pattern 412 may be substantially the same as that of the second conductive pattern 421. The first dummy pattern 412 may be substantially parallel to the second conductive pattern 421. In an embodiment, the first dummy pattern 412 may be substantially the same as the second conductive pattern 421 in thickness. In an embodiment, a length of the plurality of the conductive lines of the first dummy pattern 412 may be shorter than the first designated interval D1 of the first conductive pattern 411. For example, the length of the plurality of the conductive lines of the first dummy pattern 412 may be greater than or equal to about 5 μm and less than or equal to about 200 μm, but is not limited thereto. In an embodiment, the plurality of the conductive lines of the first dummy pattern 412 may include substantially the same material as a material included in the first conductive pattern 411. In an embodiment, the first dummy pattern 412 may be spaced apart from the first conductive pattern 411. The first dummy pattern 412 may be electrically separated from the first conductive pattern 411. In an embodiment, when viewed from the x direction, at least a part of the first dummy pattern 412 may overlap the first conductive pattern 411.

In an embodiment, the first dummy pattern 412 may be disposed between the second conductive line 442 and the second conductive pattern 421, such that at least one second conductive line 442 and the second conductive pattern 421 do not appear separated when viewed from above the conductive pattern panel 402 (e.g., when viewed from the −z direction).

In an embodiment, the second conductive pattern 421 may be disposed on the second surface 430B facing away from the first surface 430A of the dielectric layer 430. The second conductive pattern 421 may include a plurality of electrodes. The second conductive pattern 421 may not be formed in a second designated region 425 of the conductive pattern panel 402. For example, a part of the second conductive pattern 421 may be separated based on the second designated region 425. The second designated region 425 may correspond to the first designated region 415. For example, the second designated region 425 may overlap the first designated region 415, when viewed from the −z direction or the +z direction. In an embodiment, separating the first designated region 415 and the second designated region 425 of the conductive pattern panel 402 is for convenience of description, and the first designated region 415 and the second designated region 425 may be referred to as one designated region, in that the first conductive pattern 411 and/or the second conductive pattern 421 are not disposed.

In an embodiment, the second conductive pattern 421 may extend in the x-axis direction, and may be arranged at the second predetermined intervals D2 along the y axis. In an embodiment, the extension direction of the second conductive pattern 421 may be substantially perpendicular to the extension direction of the first conductive pattern 411. In an embodiment, the direction in which the second conductive pattern 421 is arranged may be substantially perpendicular to the direction in which the first conductive pattern 411 is arranged. In an embodiment, the thickness of the second conductive pattern 421 may be substantially the same as or greater than the thickness of the first conductive pattern 411. In an embodiment, even if the thickness of the second conductive pattern 421 is formed to be greater than that of the first conductive pattern 411, the thickness difference of the first conductive pattern 411 and the second conductive pattern 421 may not be visually recognized, because the second conductive pattern 421 is positioned farther away from a user's gaze at the conductive pattern panel 402.

In an embodiment, the second dummy pattern 422 may include a plurality of conductive lines. The second dummy pattern 422 may be disposed on, directly or indirectly, the second surface 430B of the dielectric layer 430. The second dummy pattern 422 may be disposed around the second designated region 425. For example, the second dummy pattern 422 may be disposed on edge portions facing the +y direction and the −y direction of edge portions of the second designated region 425. The second dummy pattern 422 may extend along the y-axis direction, and may be arranged at the first designated intervals D1 along the x-axis direction in the edge portion of the second designated region 425. For example, the direction in which the second dummy pattern 422 is arranged may be substantially perpendicular to the second conductive pattern 421. The extension direction of the second dummy pattern 422 may be substantially the same as that of the first conductive pattern 411. For example, the plurality of the conductive lines of the second dummy pattern 422 may be parallel to the first conductive pattern 411. In an embodiment, the thickness of the plurality of the conductive lines of the second dummy pattern 422 may be substantially the same as the thickness of the first conductive pattern 411. In an embodiment, the length of the plurality of the conductive lines of the second dummy pattern 422 may be shorter than the second designated interval D2 which is the interval between the second conductive pattern 421. In an embodiment, the plurality of the conductive lines of the second dummy pattern 422 may include substantially the same material as a material included in the second conductive pattern 421. In an embodiment, the second dummy pattern 422 may be spaced apart from the second conductive pattern 421. The second dummy pattern 422 may be electrically separated from the second conductive pattern 421. In an embodiment, when viewed from the y direction, at least a part of the second dummy pattern 422 may overlap the second conductive pattern 421.

In an embodiment, the second dummy pattern 422 may be disposed between the first conductive line 441 and the first conductive pattern 411, such that the at least one first conductive line 441 and the first conductive pattern 411 do not appear separated when viewed from above the conductive pattern panel 402 (e.g., when viewed from the −z direction).

In an embodiment, the antenna pattern 440 may include at least one of at least one first conductive line 441, at least one second conductive line 442, and/or at least one conductive via 443.

In an embodiment, the at least one first conductive line 441 may be disposed on the first surface 430A of the dielectric layer 430, and may be disposed in the first designated region 415 of the conductive pattern panel 402. The at least one first conductive line 441 may be spaced apart from the first conductive pattern 411 and the first dummy pattern 412. By separating the at least one first conductive line 441 from the first conductive pattern 411, radiation performance deterioration of the antenna pattern 440 may be reduced. The separation of the at least one first conductive line 441 and the first conductive pattern 411 may differ, according to required performance of the antenna pattern 440. Depending on the required performance of the antenna pattern 440, the length of the second dummy pattern 422 for preventing or reducing the separated space between the at least one first conductive line 441 and the first conductive pattern 411 from being viewed may also differ. The at least one first conductive line 441 may be electrically separated from the first conductive pattern 411 and the first dummy pattern 412.

In an embodiment, the at least one first conductive line 441 may extend in substantially the same direction as the first conductive pattern 411. For example, the at least one first conductive line 441 may be substantially parallel to the first conductive pattern 411. If a plurality of the at least one first conductive lines 441 is formed, the at least one first conductive line 441 may be arranged at the first designated intervals D1 in substantially the same direction as the direction in which the first conductive pattern 411 is arranged (e.g., the x-axis direction).

In an embodiment, the at least one second conductive line 442 may be disposed on the second surface 430B of the dielectric layer 430, and may be disposed in the second designated region 425 of the conductive pattern panel 402. The at least one second conductive line 442 may be spaced apart from the second conductive pattern 421 and the second dummy pattern 422. By separating the at least one second conductive line 442 from the second conductive pattern 421, the radiation performance deterioration of the antenna pattern 440 may be reduced. The separation of the at least one second conductive line 442 and the second conductive pattern 421 may differ, according to the required performance of the antenna pattern 440. The length of the conductive lines of the first dummy pattern 412 for preventing or reducing the space in which the at least one second conductive line 442 and the second conductive pattern 421 are separated from being viewed may differ, depending on the required performance of the antenna pattern 440. The at least one second conductive line 442 may be electrically separated from the second conductive pattern 421 and the second dummy pattern 422.

In an embodiment, the at least one second conductive line 442 may extend in substantially the same direction as the second conductive pattern 421. For example, the at least one second conductive line 442 may be substantially parallel to the second conductive pattern 421. If a plurality of the at least one second conductive lines 442 is formed, the at least one second conductive line 442 may be arranged at the second designated intervals D2 in substantially the same direction as the direction in which the second conductive pattern 421 is arranged (e.g., the y-axis direction).

In an embodiment, the at least one conductive via 443 may be connected, directly or indirectly, with the at least one first conductive line 441 and the at least one second conductive line 442. The at least one conductive via 443 may be disposed at a position where the at least one first conductive line 441 and the at least one second conductive line 442 overlap, when viewed from above the antenna pattern 440 (e.g., when viewed from the −z direction). The at least one conductive via 443 may be disposed between the at least one first conductive line 441 and the at least one second conductive line 442. The at least one conductive via 443 may pass through the dielectric layer 430. The at least one first conductive line 441 and the at least one second conductive line 442 may be electrically connected through the at least one conductive via 443. The at least one conductive via 443 may improve radiation performance of the antenna pattern 440, by increasing electrical conductivity of the antenna pattern 440 and lowering electrical resistance.

In an embodiment, the antenna pattern 440 may operate as a radiator for transmitting or receiving a radio frequency (RF) signal (e.g., mmWave signal) of a designated band. Since the antenna pattern 440 is electrically separated from the electrodes of the conductive pattern panel 402 and formed on the same layer, the electronic device 101 according to an embodiment may perform the touch input detection using the conductive pattern panel 402 and wireless communication using the antenna pattern 440 without the performance degradation. In an embodiment, the antenna pattern 440 may be disposed to face a front surface (e.g., the front surface 210A of FIG. 2A) of the electronic device, and communication coverage of the front direction of the electronic device 101 may be improved.

In an embodiment, a size of the antenna pattern 440 may vary according to the frequency band of the RF signal to be transmitted and/or received. For example, if the antenna pattern 440 operates as a patch antenna at the frequency of about 28 GHz, the width and the length of the antenna pattern 440 may be about 2.3 mm. However, it is not limited thereto.

In an embodiment, the conductive pattern panel 402 may have a designated pattern. For example, referring to FIG. 4C, when viewed from above the conductive pattern panel 402 (e.g., when viewed from the −z direction of FIG. 4A), the conductive pattern panel 402 may include a grid pattern formed with a plurality of rows extending along the x axis and a plurality of columns extending along the y axis.

In an embodiment, at least one of the at least one first conductive line 441, at least one electrode of the first conductive pattern 411, and the second dummy pattern 422 may be viewed as one row of the conductive pattern panel 402, when viewed from above the conductive pattern panel 402. For example, referring to FIG. 4C, a first electrode 411-1 of the first conductive pattern 411, a first dummy line 422-1 of the second dummy pattern 422, a first line 441-1 of the at least one first conductive line 441, a second dummy line 422-2 of the second dummy pattern 422, and a second electrode 411-2 of the first conductive pattern 411 may be disposed to appear as a first column C1 of the conductive pattern panel 402.

In an embodiment, at least one of the at least one second conductive line 442, at least one electrode of the second conductive pattern 421, and the first dummy pattern 412 may appear as one row of the conductive pattern panel 402, when viewed from above the conductive pattern panel 402. For example, referring to FIG. 4C, a first electrode 421-1 of the second conductive pattern 421, a first dummy line 412-1 of the first dummy pattern 412, a first line 442-1 of the at least one second conductive line 442, a second dummy line 412-2 of the first dummy pattern 412, and a second electrode 421-2 of the second conductive pattern 421 may be disposed to appear as a first row R1 of the conductive pattern panel 402.

In an embodiment, even if the antenna pattern 440 is positioned in the conductive pattern panel 402, the first and second conductive patterns 411 and 421 or the antenna pattern 440 of the conductive pattern panel 402 may not be visible to the user. The antenna pattern 440 is formed in substantially the same pattern as the first and second conductive patterns 411 and 421 for detecting the touch input, the first and second dummy patterns 421 and 422 are formed in the space between the antenna pattern 440 and the first and second conductive patterns 411 and 421, and accordingly the conductive pattern panel 402 may be viewed as a uniform pattern on the whole.

In an embodiment, referring to FIG. 5, the second dummy pattern 522 may be thicker than the first conductive pattern 411 and the first dummy pattern 412. As shown in FIG. 4C, if the first dummy pattern 412 and the second dummy pattern 422 have the same thickness, the second dummy pattern 422 may appear thinner than the first dummy pattern 412 because the second dummy pattern 422 is disposed lower than the first dummy pattern 412 (e.g., the −z direction). In an embodiment, by forming the second dummy pattern 522 to be thicker than the first dummy pattern 412, the phenomenon that the first dummy pattern 412 and the second dummy pattern 422-1 appear different in thickness may be reduced.

Figure 6A:
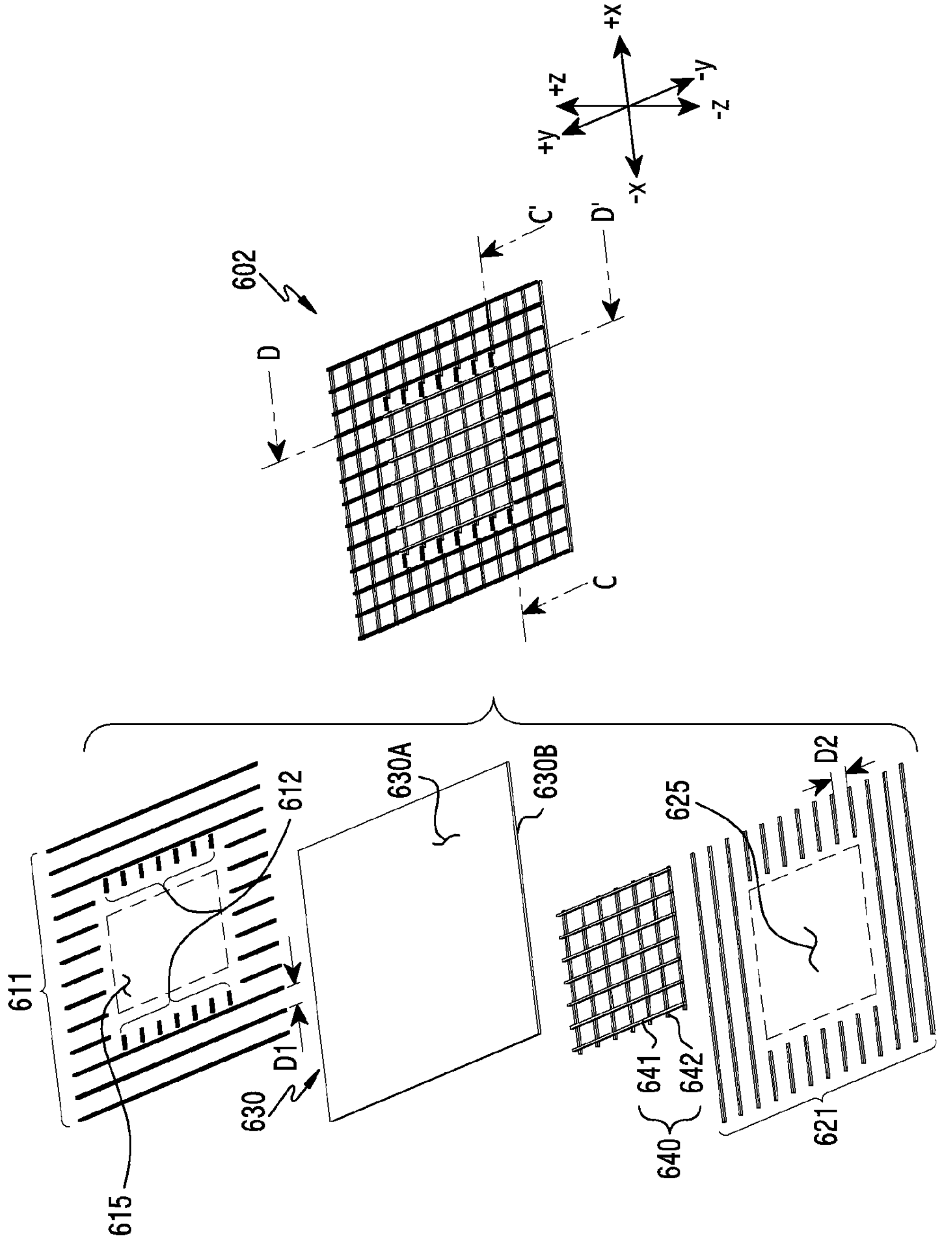
FIG. 6A illustrates a conductive pattern panel according to an example embodiment.

FIG. 6A illustrates a conductive pattern panel according to an embodiment.

Figure 6B:
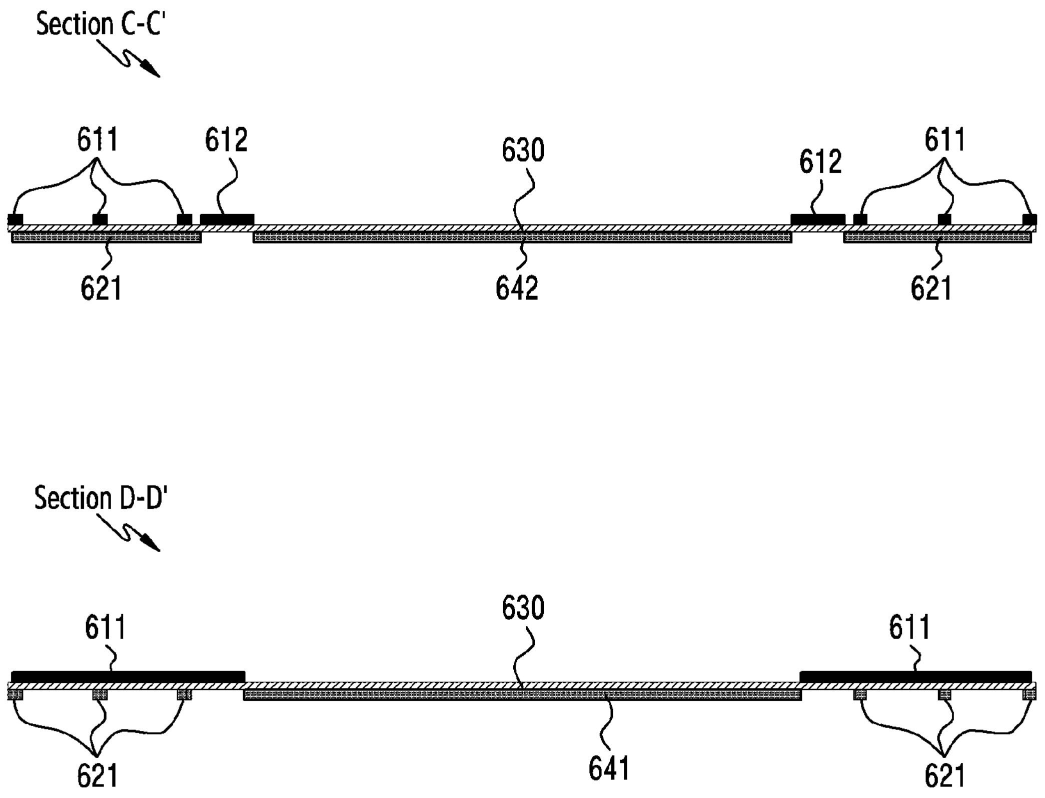
FIG. 6B illustrates a section C-C' and a section D-D' of FIG. 6A.

FIG. 6B illustrates a section C-C' and a section D-D' of FIG. 6A.

Figure 6C:
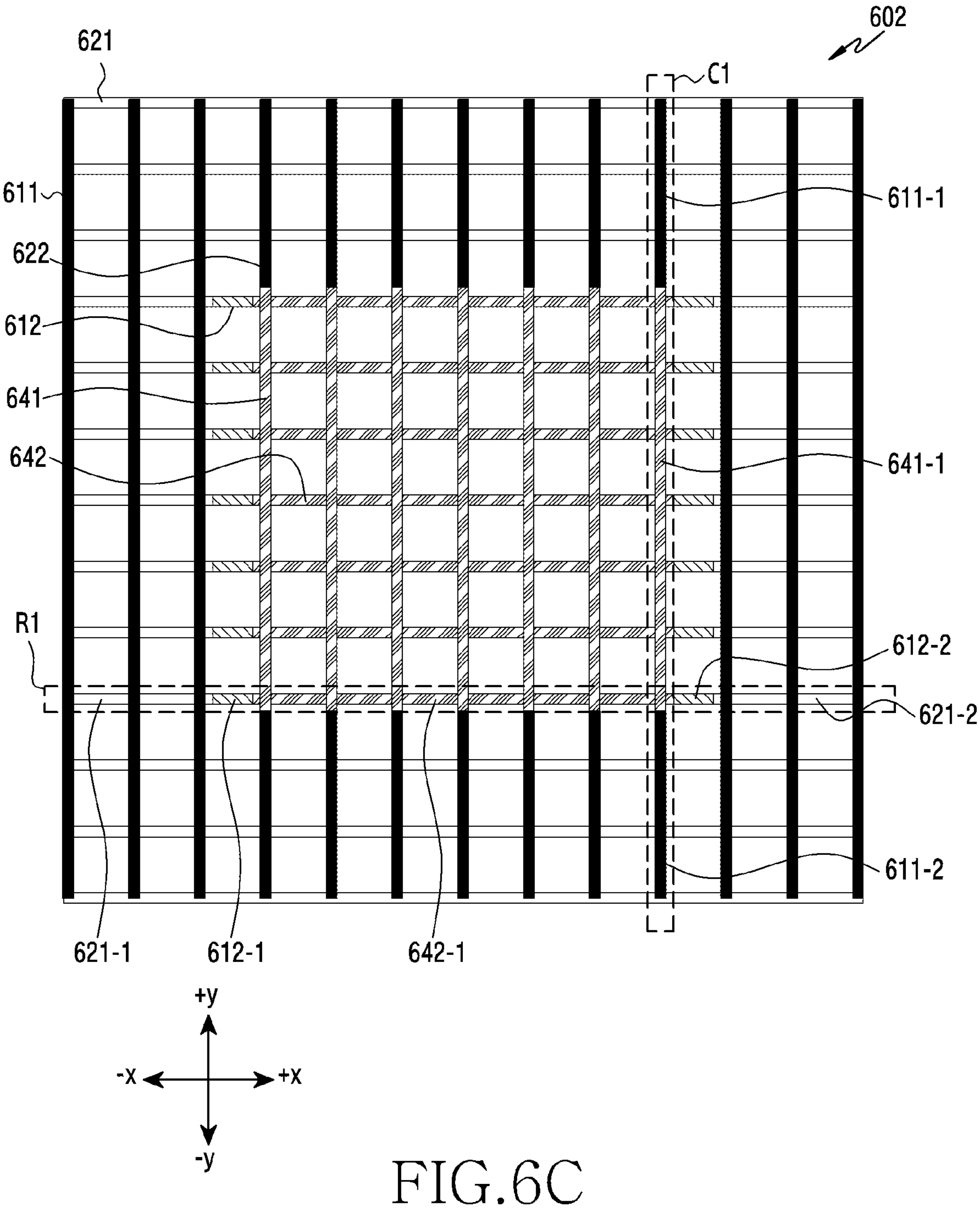
FIG. 6C is a plan view of a conductive pattern panel of FIG. 6A when viewed from the −z direction.

FIG. 6C is a plan view of the conductive pattern panel of FIG. 6A when viewed from the −z direction.

Referring to FIG. 6A through FIG. 6C, a conductive pattern panel 602 according to an embodiment may include at least one of a first conductive pattern 611, a first dummy pattern 612, an antenna pattern 640, a dielectric layer 630, and/or a second conductive pattern 621.

The conductive pattern panel 602 of FIG. 6A through FIG. 6C may correspond to the conductive pattern panel 302 of FIG. 3. In an embodiment, the first conductive pattern 611, and the first dummy pattern 612 of the conductive pattern panel 602 may correspond to the first pattern portion 310 of FIG. 3. In an embodiment, the antenna pattern 640, and the second conductive pattern 621 of the conductive pattern panel 602 may correspond to the second pattern portion 320 of FIG. 3. In an embodiment, the dielectric layer 630 of the conductive pattern panel 602 may correspond to the dielectric layer 330 of FIG. 3.

In an embodiment, descriptions on the first conductive pattern 611, the first dummy pattern 612, and the second conductive pattern 621 of FIG. 6A through FIG. 6C may adopt the descriptions on the first conductive pattern 411, the first dummy pattern 412, and the second conductive pattern 421 of FIG. 4A through FIG. 5 in the substantially identical or corresponding manner.

In an embodiment, the antenna pattern 640 may include at least one first conductive line 641 and at least one second conductive line 642.

In an embodiment, the at least one first conductive line 641 and the at least one second conductive line 642 may be formed on a second surface 630B of the dielectric layer 630, and may be disposed in a second designated region 625 of the conductive pattern panel 602. Since the at least one first conductive line 641 and the at least one second conductive line 642 are formed on the same layer, the antenna pattern 640 may not include the at least one conductive via 443 of FIG. 4A for electrically connecting them.

In an embodiment, the at least one first and second conductive lines 641 and 642 may be spaced apart from the second conductive pattern 621 based on the dielectric layer 630. By separating the at least one first and second conductive lines 641 and 642 from the second conductive pattern 621, radiation performance deterioration of the antenna pattern 640 may be reduced. Depending on required performance of the antenna pattern 640, the separation of the at least one first and second conductive lines 641 and 642 and the second conductive pattern 621 may differ, and a length of conductive lines of the first dummy pattern 612 for preventing or reducing the space from being viewed may differ. The at least one first and second conductive lines 641 and 642 may be electrically separated from the first conductive pattern 611, the second conductive pattern 621 and the first dummy pattern 612.

In an embodiment, the at least one first conductive line 641 may extend in substantially the same direction (e.g., the y-axis direction) as the first conductive pattern 611. For example, the at least one first conductive line 641 may be substantially parallel to the second conductive pattern 621. In an embodiment, if there is a plurality of the at least one first conductive lines 641, the at least one first conductive line 641 may be arranged at substantially the same intervals (e.g., a first designated interval D1) and in substantially the direction (e.g., the x-axis direction) as the first conductive pattern 611. When viewed from above the conductive pattern panel 602 (e.g., the −z direction), some of the plurality of the conductive lines included in the first conductive pattern 611 may be separated based on a first designated region 615. When viewed from above the conductive pattern panel 602, since the at least one first conductive line 641 extends in substantially the same direction as the first conductive pattern 611 and arranged at substantially identical intervals in the second designated region 625 overlapping the first designated region 615, the conductive pattern panel 602 may appear as a uniform pattern on the whole.

In an embodiment, the at least one second conductive line 642 may extend in substantially the same direction as the second conductive pattern 621 (e.g., the x-axis direction). For example, the at least one second conductive line 642 may be substantially parallel to the second conductive pattern 621. In an embodiment, if the at least one second conductive line 642 is in a plural number, the at least one second conductive line 642 may be arranged at substantially the same intervals (e.g., the second designated interval D2)

and in substantially the same direction (e.g., the y-axis direction) as the second conductive pattern 621. When viewed from above the conductive pattern panel 602 (e.g., the −z direction), some of the second conductive pattern 621 may be separated based on the second designated region 625. When viewed from above the conductive pattern panel 602, since the at least one second conductive line 642 extends in the same direction as the second conductive pattern 621 and is arranged at substantially identical intervals in the second designated region 625, the conductive pattern panel 602 may appear as a uniform pattern on the whole. In an embodiment, a first dummy pattern 612 may be disposed between the second conductive pattern 621 and the at least one second conductive line 642 in the first designated region 615, such that the at least one second conductive line 642 and the second conductive pattern 621 do not appear separated when viewed from above the conductive pattern panel 602 (e.g., the −z direction).

In an embodiment, the antenna pattern 640 may operate as a radiator for transmitting or receiving an RF signal (e.g., a mmWave signal) of a designated band. Since the antenna pattern 640 is formed on the same layer as the second conductive pattern 621 of the conductive pattern panel 602, the electronic device 101 according to an embodiment may perform touch input detection using the conductive pattern panel 602 and wireless communication using the antenna pattern 640, without performance degradation of the conductive pattern panel 602 and the antenna pattern 640.

In an embodiment, the conductive pattern panel 602 may have a designated pattern. For example, referring to FIG. 6C, when viewed from above the conductive pattern panel 602 (e.g., the −z direction of FIG. 6A), the conductive pattern panel 602 may have a pattern including rows extending in the x-axis direction and columns extending in the y-axis direction.

In an embodiment, when viewed from above the conductive pattern panel 602, at least one electrode of the first conductive pattern 611 and at least one first conductive line 641 may appear as a single column of the pattern of the conductive pattern panel 602. For example, referring to FIG. 6C, a first electrode 611-1 of the first conductive pattern 611, a first line 641-1 of the at least one first conductive line 641, and a second electrode 611-2 of the first conductive pattern 611 may be arranged to appear as a first column C1 of the conductive pattern panel 602.

In an embodiment, when viewed from above the conductive pattern panel 602, at least one electrode of the second conductive pattern 621, at least one of the first dummy pattern 612, and the at least one second conductive line 642 may appear as one row of the conductive pattern panel 602. For example, referring to FIG. 6C, a first electrode 621-1 of the second conductive pattern 621, a first dummy line 612-1 of the first dummy pattern 612, a first line 642-1 of the at least one second conductive line 642, a second line 612-2 of the first dummy pattern 612, and a second electrode 621-2 of the second conductive pattern 621 may be arranged to appear as a first row R1 of the conductive pattern panel 602.

In an embodiment, even if the antenna pattern 640 is disposed on the conductive pattern panel 602, the first conductive pattern 611, and the second conductive pattern 621 or the antenna pattern 640 of the conductive pattern panel 602 may not be visible to the user. For example, referring to FIG. 6C, the antenna pattern 640 is formed in substantially the same pattern as the first and second conductive patterns 611 and 621 for detecting a touch input, the first dummy pattern 612 is formed in the space between the antenna pattern 640 and the first and second conductive patterns 611 and 621, and accordingly the conductive pattern panel 602 may appear as a uniform pattern on the whole.

Figure 6D:
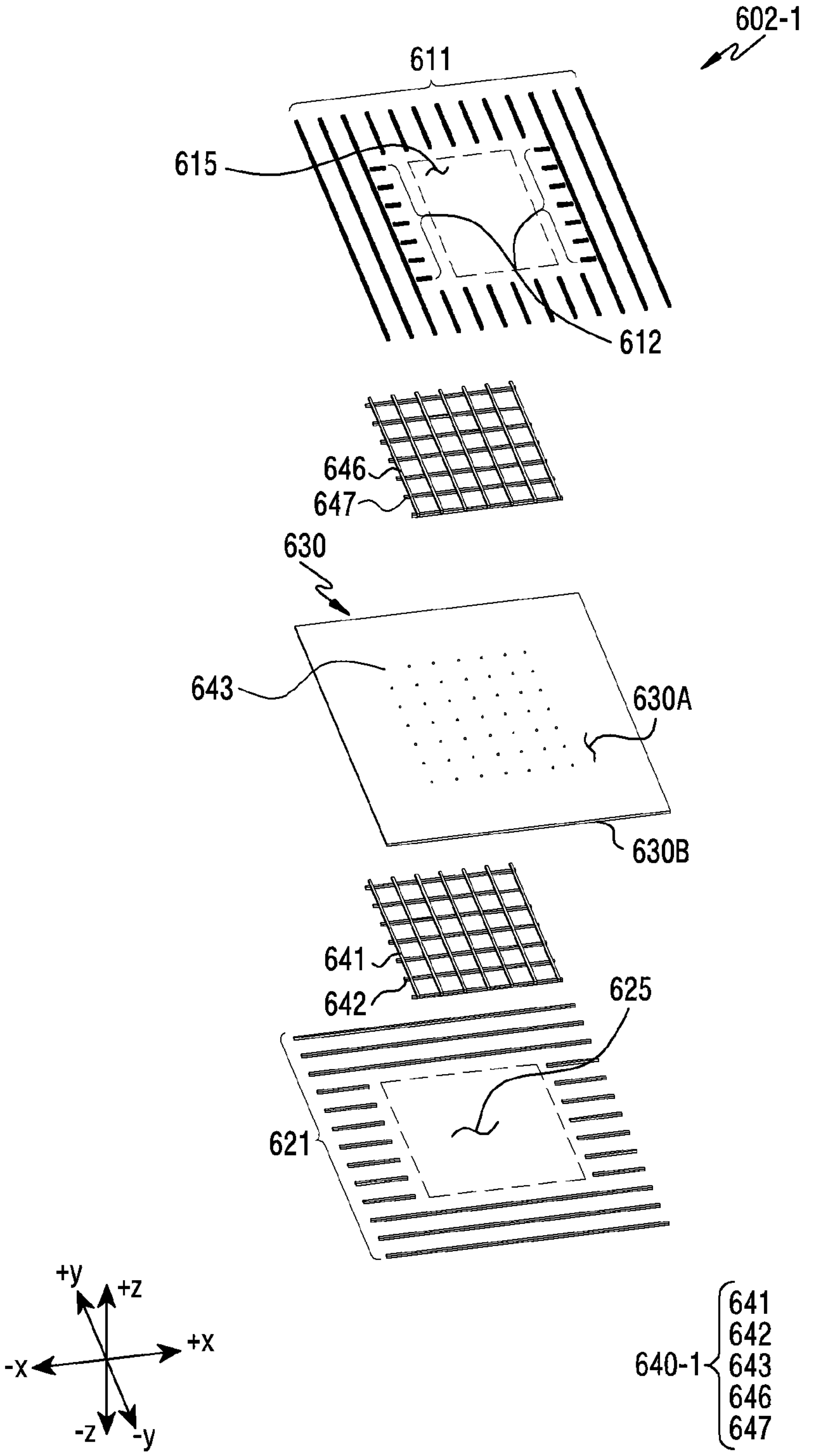
FIG. 6D illustrates a conductive pattern panel according to another example embodiment.

FIG. 6D illustrates a conductive pattern panel according to an embodiment.

Referring to FIG. 6D, the conductive pattern panel according to an embodiment may include an antenna pattern 640-1.

In an embodiment, the antenna pattern 640-1 may include at least one of a first conductive line 641, at least one second conductive line 642, at least one third conductive line 646, at least one fourth conductive line 647, and/or at least one conductive via 643.

In an embodiment, description on the at least one third conductive line 646 may adopt the description on the at least one first conductive line 641, except that the at least one third conductive line 646 is disposed on a first surface 630A of the dielectric layer 630.

In an embodiment, description on the at least one fourth conductive line 647 may adopt the description on the at least one second conductive line 642, except that the at least one fourth conductive line 647 is disposed on the first surface 630A of the dielectric layer 630.

In an embodiment, the at least one conductive via 643 may electrically connect the at least one third and fourth conductive lines 646 and 647 disposed on, directly or indirectly, the first surface 630A of the dielectric layer 630 and the at least one first and second conductive lines 641 and 642 disposed on the second surface 630B of the dielectric layer 630. In an embodiment, the at least one conductive via 643 may be disposed at a position where the at least one first and second conductive lines 641 and 642 and the at least one third and fourth conductive lines 646 and 647 overlap, when viewed from above the dielectric layer 630 (e.g., viewed from the −z direction). The at least one conductive via 643 may pass through the dielectric layer 630.

In an embodiment, the antenna pattern 640-1, which further includes the at least one third and fourth conductive lines 646 and 647 disposed on, directly or indirectly, the first surface 630A of the dielectric layer 630, may be greater in thickness than the antenna pattern 640 shown in FIG. 6A through FIG. 6C. In an embodiment, as the thickness of the antenna pattern 640-1 increases, resistance may decrease.

Figure 7:
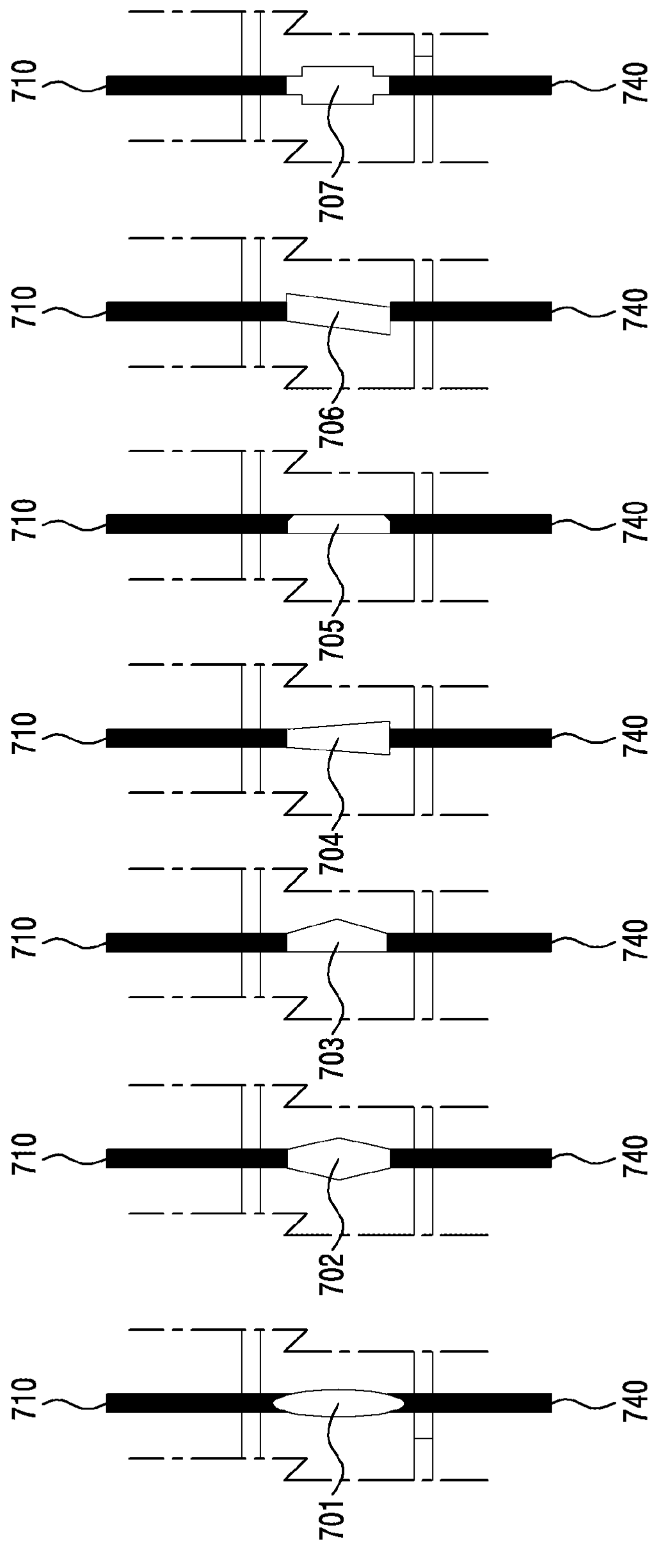
FIG. 7 illustrates examples of a conductive line of a dummy pattern according to an example embodiment.

FIG. 7 illustrates examples of a conductive line of a dummy pattern according to an embodiment.

An electrode 710 of FIG. 7 may correspond to the electrodes (e.g., the first electrode 411-1 of FIG. 4C) separated from the first designated region 415 in the first conductive pattern 411 of FIG. 4C, and a conductive line 740 may correspond to the at least one first conductive line 441 of FIG. 4C. The electrode 710 of FIG. 7 may correspond to the electrodes (e.g., the first electrode 421-1 of FIG. 4C) separated from the second designated region 425 in the second conductive pattern 421 of FIG. 4C, and the conductive line 740 may correspond to the at least one second conductive line 442 of FIG. 4C. The electrode 710 of FIG. 7 may correspond to the electrodes (e.g., the first electrode 621-1 of FIG. 6C) separated from the second designated region 625 in the second conductive pattern 621 of FIG. 6C, and the conductive line 740 may correspond to the at least one second conductive line 642 of FIG. 6C.

At least one of dummy patterns 701 through 707 shown in FIG. 7 may be applied to the first dummy pattern 412 and/or the second dummy pattern 422 of FIG. 4A. At least one of the dummy patterns 701 through 707 shown in FIG. 7 may be applied to the first dummy pattern 612 of FIG. 6A.

Referring to FIG. 7, the dummy pattern disposed between the electrode 710 and the conductive line 740 may have various shapes. For example, the dummy pattern 701 may have an elliptical shape. As another example, the dummy pattern 702 may be hexagonal. As another example, the dummy pattern 703 may have a pentagonal shape. As another example, the dummy pattern 704 may include a trapezoidal shape. As another example, the dummy pattern 705 may be a quadrilateral with at least one corner cut off. As another example, the dummy pattern 706 may be a parallelogram. As another example, the dummy pattern 707 may be a polygon having different thickness.

In an embodiment, the shape of the dummy pattern may allow various design changes applicable by those skilled in the art, and is not limited by the above-described examples.

Figure 8:
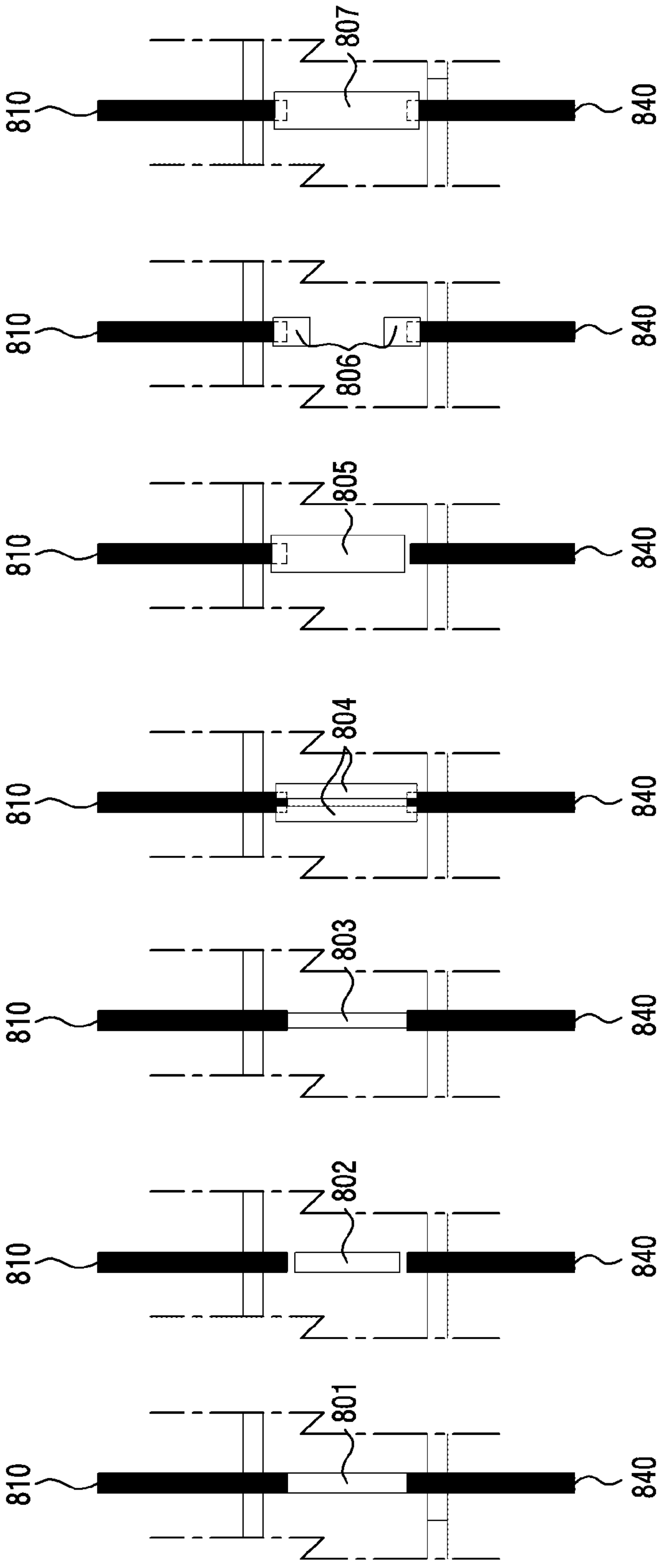
FIG. 8 illustrates examples of a conductive line of a dummy pattern according to another example embodiment.

FIG. 8 illustrates examples of a conductive line of a dummy pattern according to an embodiment.

An electrode 810 of FIG. 8 may correspond to the electrodes (e.g., the first electrode 411-1 of FIG. 4C) separated from the first designated region 415 in the first conductive pattern 411 of FIG. 4C, and a conductive line 840 may correspond to the at least one first conductive line 441 of FIG. 4C. The electrode 810 of FIG. 8 may correspond to the electrodes (e.g., the first electrode 421-1 of FIG. 4C) separated from the second designated region 425 in the second conductive pattern 421 of FIG. 4C, and the conductive line 840 may correspond to the at least one second conductive line 442 of FIG. 4C. The electrode 810 of FIG. 8 may correspond to the electrodes (e.g., the first electrode 621-1 of FIG. 6C) separated from the second designated region 625 in the second conductive pattern 621 of FIG. 6C, and the conductive line 840 may correspond to the at least one second conductive line 642 of FIG. 6C.

At least one of dummy patterns 801 through 807 shown in FIG. 8 may be applied to the first dummy pattern 412 of FIG. 4A, the second dummy pattern 422 of FIG. 4A, and the first dummy pattern 612 of FIG. 6A.

Referring to FIG. 8, the dummy pattern may be disposed to cover at least a part of a space segmented between the electrode 810 and the conductive line 840.

For example, when viewed from above (e.g., the −z direction) a conductive pattern panel (e.g., the conductive pattern panel 602 of FIG. 6A), the dummy pattern 801 may cover the whole space between the electrode 810 and the conductive line 840. For example, the length of the dummy pattern 801 may be equal to or longer than the spacing between the electrode 810 and the conductive line 840.

As another example, the dummy pattern 802 may be spaced apart from the electrode 810 and the conductive line 840, and may cover a part of the space between the electrode 810 and the conductive line 840. For example, the length of the dummy pattern 802 may be shorter than the spacing between the electrode 810 and the conductive line 840.

As another example, the dummy pattern 803 may have a smaller thickness than the electrode 810 and the conductive line 840, and may cover a part of the space between the electrode 810 and the conductive line 840.

As another example, the dummy pattern 804 may be divided into two strands to extend, and cover a part of the space between the electrode 810 and the conductive line 840. When viewed from above (e.g., the −z direction) the conductive pattern panel (e.g., the conductive pattern panel 602 of FIG. 6A), at least a part of the dummy pattern 804 may overlap at least in part the electrode 810 and the conductive line 840.

As another example, the dummy pattern 805 may have a greater thickness than the electrode 810 and the conductive line 840, and may overlap the electrode 810 but may not overlap the conductive line 840, when viewed from above (e.g., the −z direction) the conductive pattern panel (e.g., the conductive pattern panel 602 of FIG. 6A). The dummy pattern 805 may cover a part of the space between the electrode 810 and the conductive line 840.

As another example, when viewed from above (e.g., the −z direction) the conductive pattern panel (e.g., the conductive pattern panel 602 of FIG. 6A), the dummy pattern 806 may include a first portion overlapping the electrode 810 and a second portion overlapping the conductive line 840, and the first portion and the second portion may be spaced apart. The dummy pattern 806 may cover a part of the space between the electrode 810 and the conductive line 840. In an embodiment not depicted, another dummy pattern may be disposed, to cover the space between the electrode 810 and the conductive line 840 which is not covered by the dummy pattern 806.

As another example, when viewed from above (e.g., in the −z direction) the conductive pattern panel (e.g., the conductive pattern panel 602 of FIG. 6A), the dummy pattern 807 may have a greater thickness than the electrodes 810 and the conductive lines 840, and may overlap the electrode 810 and the conductive line 840. The dummy pattern 807 may cover the entire space between the electrode 810 and the conductive line 840.

Figure 9A:
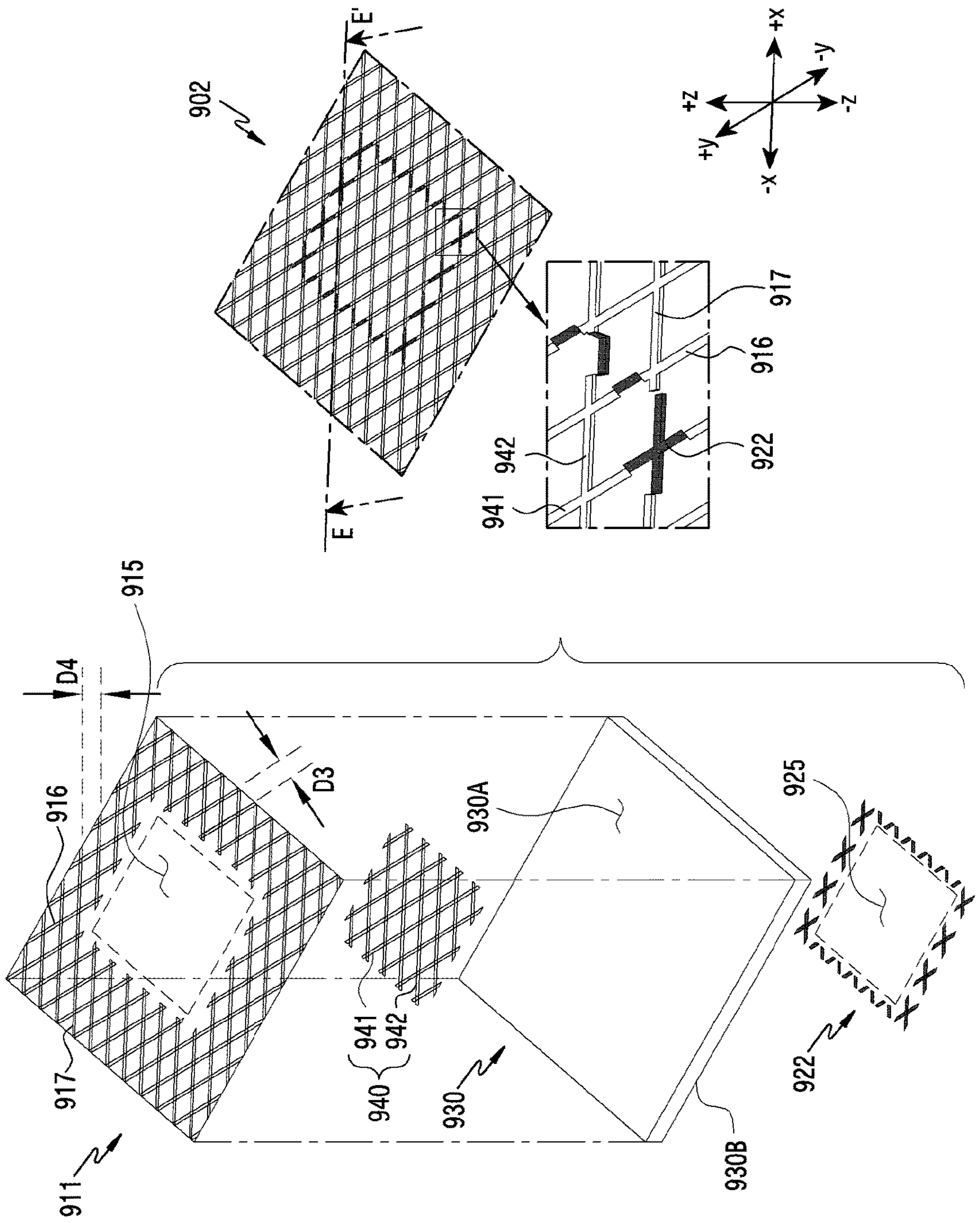
FIG. 9A illustrates a conductive pattern panel according to an example embodiment.

FIG. 9A illustrates a conductive pattern panel according to an embodiment.

Figure 9B:
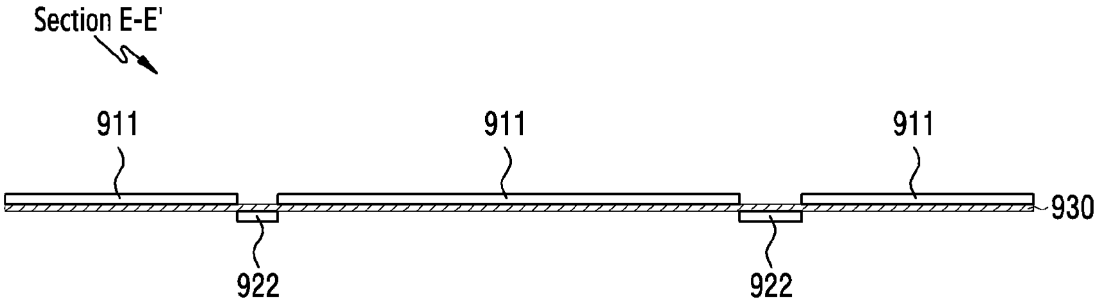
FIG. 9B illustrates a section E-E' of FIG. 9A.

FIG. 9B illustrates a section E-E' of FIG. 9A.

Figure 9C:
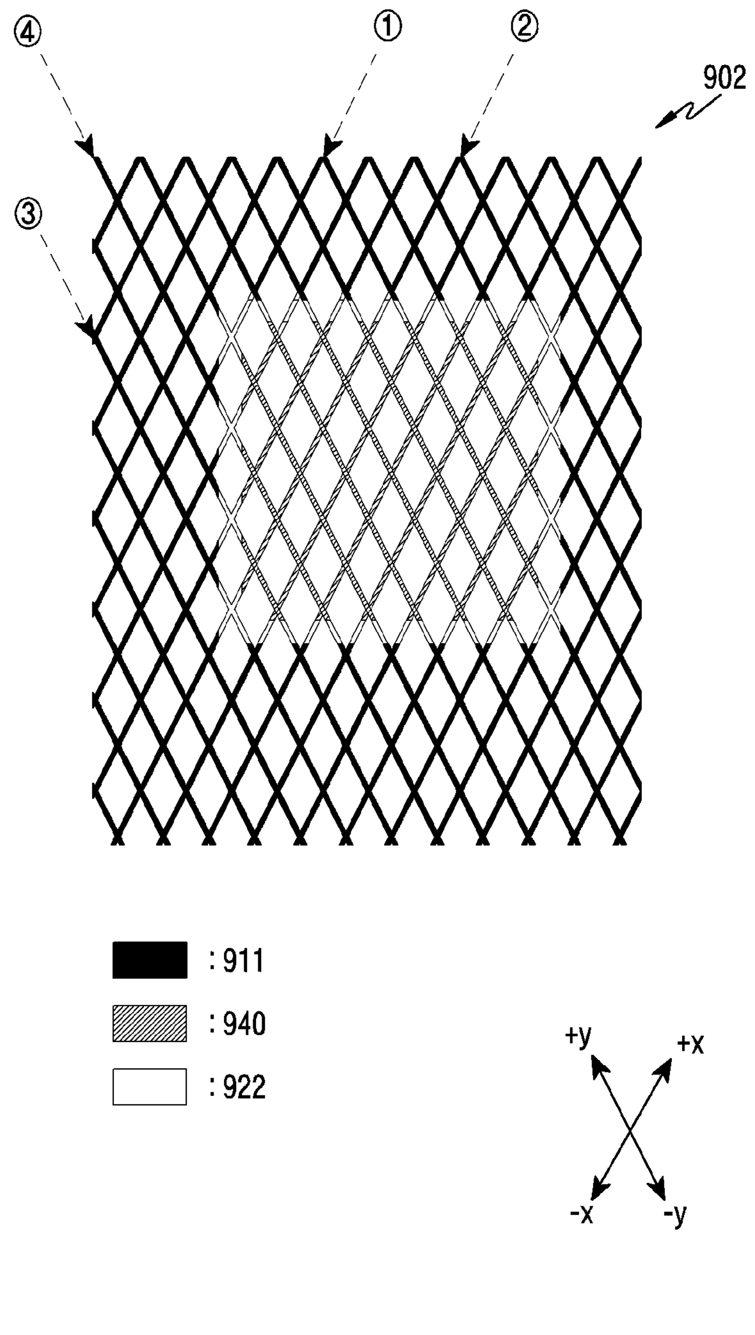
FIG. 9C is a plan view of a conductive pattern panel of FIG. 9A when viewed from the −z direction.

FIG. 9C is a plan view of the conductive pattern panel of FIG. 9A when viewed from the −z direction.

A conductive pattern panel 902 of FIG. 9A through FIG. 9C may correspond to the conductive pattern panel 302 of FIG. 3. In an embodiment, the first conductive pattern 911 of the conductive pattern panel 902 may correspond to the first pattern portion 310 and/or the second pattern portion 320 of FIG. 3. In an embodiment, an antenna pattern 940 of the conductive pattern panel 902 may correspond to the first pattern portion 310 of FIG. 3. In an embodiment, a second dummy pattern 922 of the conductive pattern panel 902 may correspond to the second pattern portion 320 of FIG. 3. In an embodiment, a dielectric layer 930 of the conductive pattern panel 902 may correspond to the dielectric layer 330 of FIG. 3.

Referring to FIG. 9A, FIG. 9B and FIG. 9C, the conductive pattern panel 902 according to an embodiment may include at least one of the first conductive pattern 911, the second dummy pattern 922, the antenna pattern 940, and/or the dielectric layer 930.

In an embodiment, the first conductive pattern 911 may be formed on a first surface 930A of the dielectric layer 930. The first conductive pattern 911 may not be formed in a first designated region 915 of the conductive pattern panel 902. For example, the first conductive pattern 911 may include a plurality of conductive members, and some of the plurality of the conductive members may be separated based on the first designated region 915. The shape of the first designated region 915 may be, for example, a quadrangle, but is not limited thereto.

In an embodiment, the first conductive pattern 911 may include first conductive members 916 extending in the y-axis direction and arranged at third designated intervals D3 along the x-axis direction, and second conductive members 917 extending in the x-axis direction and arranged at fourth designated intervals D4 along the y-axis direction. In an embodiment, the third designated interval D3 and the fourth designated interval D4 may be substantially identical, but are not limited thereto. For example, the third designated interval D3 and the fourth designated interval D4 may be different. Unlike FIG. 4A, the first conductive members 916 and the second conductive members 917 of the first conductive pattern 911 may not be perpendicular to each other. For example, unlike the conductive pattern panel 402 of FIG. 4A having the rectangular grid pattern, the first conductive pattern 911 may have a mesh pattern including a parallelogram formed by the first conductive members 916 and the second conductive members 917. If the third designated interval D3 and the fourth designated interval D4 are substantially the same, the first conductive pattern 911 may have a mesh pattern including a rhombus shape. If the third designated interval D3 and the fourth designated interval D4 are different from each other, the first conductive pattern 911 may have a mesh pattern including a parallelogram. The y axis and the x axis shown in FIG. 9A are to explain the direction in which the first conductive pattern 911 extends, and do not illustrate orthogonal coordinates.

In an embodiment, the second dummy pattern 922 may be disposed on, directly or indirectly, a second surface 930B of the dielectric layer 930, to surround a second designated region 925. For example, the second dummy pattern 922 may include a plurality of conductive lines. When viewed from above the dielectric layer 930, the second designated region 925 may overlap the first designated region 915. For example, the second designated region 925 may overlap the first designated region 915, when viewed from the +z direction. The second dummy pattern 922 may be disposed, for example, along an edge of the second designated region 925.

In an embodiment, a part of the second dummy pattern 922 may have the same pattern as the mesh pattern of the first conductive pattern 911. In an embodiment, the thickness of the plurality of the conductive lines of the second dummy pattern 922 may be substantially the same as the thickness of the first conductive pattern 911.

In an embodiment, the second dummy pattern 922 may be disposed between the antenna pattern 940 and the first conductive pattern 911, such that the antenna pattern 940 and the first conductive pattern 911 do not appear separated, when viewed from above (e.g., −z direction) the conductive pattern panel 902.

In an embodiment, the antenna pattern 940 may include conductive lines forming substantially the same pattern as the pattern of the first conductive pattern 911. For example, the antenna pattern 940 may include at least one first conductive line 941 extending in the y-axis direction and arranged at the third designated intervals D3 along the x-axis direction, and at least one second conductive line 942 extending in the x-axis direction and arranged at the fourth designated intervals D4 along the y-axis direction. The antenna pattern 940 may have substantially the same pattern as the mesh pattern of the first conductive pattern 911.

In an embodiment, the antenna pattern 940 may be disposed on, directly or indirectly, the first surface 930A of the dielectric layer 930, and may be disposed in the first designated region 915 of the conductive pattern panel 902.

In an embodiment, the antenna pattern 940 may be spaced apart from the first conductive pattern 911. Since the antenna pattern 940 is spaced apart from the first conductive pattern 911, radiation performance deterioration of the antenna pattern 940 may be reduced. The antenna pattern 940 may be electrically separated from the first conductive pattern 911 and the second dummy pattern 922.

In an embodiment, when viewed from above the conductive pattern panel 902 (e.g., viewed from the −z direction of FIG. 9A), the conductive pattern panel 902 may have a uniform mesh pattern on the whole. For example, referring to FIG. 9C, the pattern of the conductive pattern panel 902 may include a first pattern extending along the x axis and a second pattern extending along the y axis. A pattern having a parallelogram shape may be formed by the first pattern and the second pattern. In an embodiment, when viewed from above the conductive pattern panel 902 (e.g., viewed from the −z direction in FIG. 9A), a part of the first conductive pattern 911 and a part of the second dummy pattern 922 parallel to a part of the first conductive pattern 911 may be disposed to appear to extend a diagonal line ① disconnected by the first designated region 915. In an embodiment, when viewed from above the conductive pattern panel 902, a part of the first conductive pattern 911, a part of the second dummy pattern 922, and the antenna pattern 940 may be disposed to appear to extend a diagonal line ② disconnected by the first designated region 915. In an embodiment, when viewed from above the conductive pattern panel 902, a part of the first conductive pattern 911 and a part of the second dummy pattern 922 may be disposed to appear to extend a diagonal line ③ disconnected by the first designated region 915. In an embodiment, when viewed from above the conductive pattern panel 902, a part of the first conductive pattern 911, a part of the second dummy pattern 922, and a part of the antenna pattern 940 may be disposed to appear to extend a diagonal line ④ disconnected by the first designated region 915. In an embodiment, even if the antenna pattern 940 is disposed on the conductive pattern panel 902, the conductive pattern panel 902 forms the uniform pattern on the whole due to the second dummy pattern 922, and accordingly the first conductive pattern 911 and/or the antenna pattern 940 of the conductive pattern panel 902 may not be visible to the user.

In an embodiment, the antenna pattern 940 may operate as a radiator for transmitting or receiving an RF signal (e.g., a mmWave signal) of a designated band. The electronic device 101 according to an embodiment may perform touch input detection using the first conductive pattern 911 and wireless communication using the antenna pattern 940, by way of the conductive pattern panel 902.

Figure 10A:
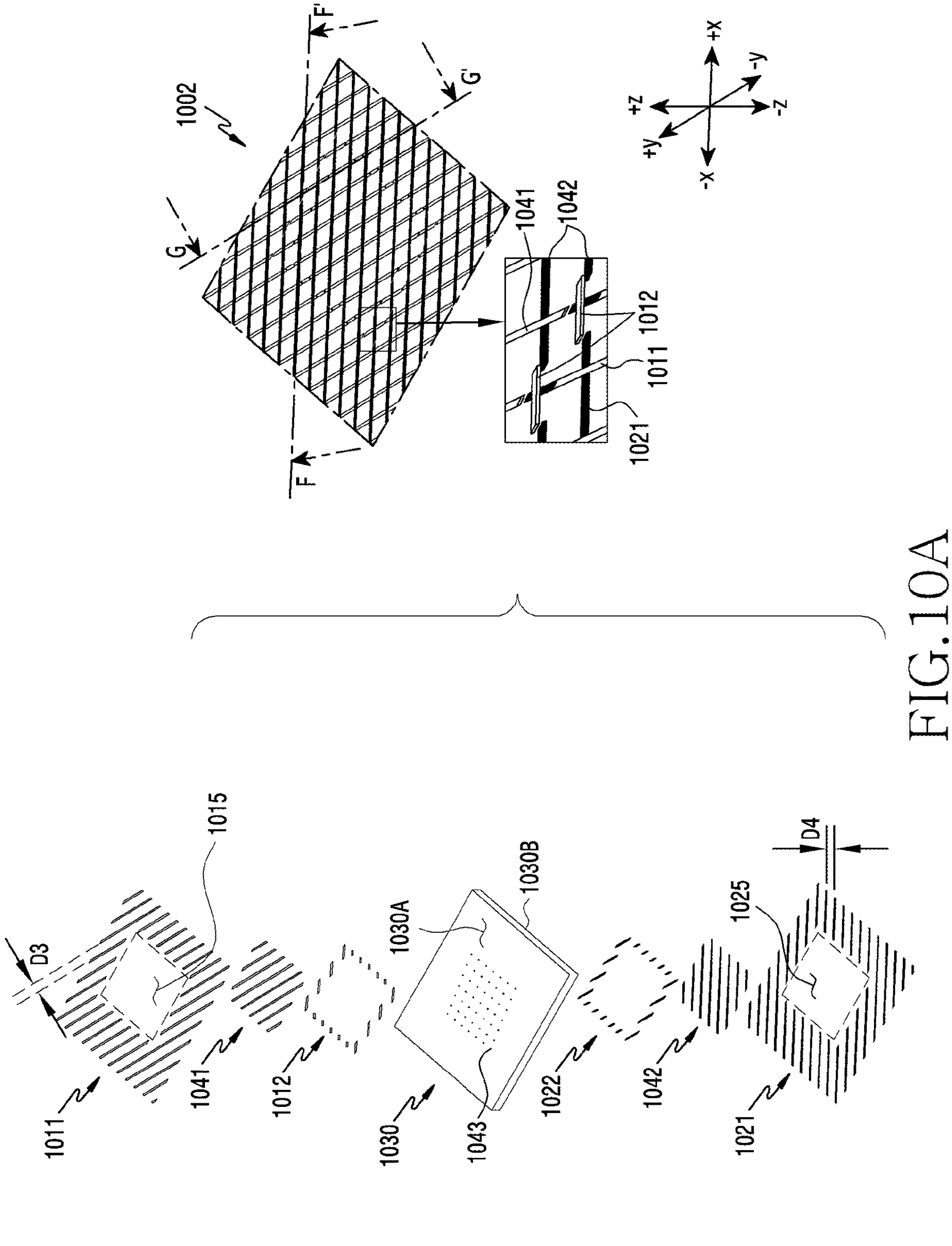
FIG. 10A illustrates a conductive pattern panel according to an example embodiment.

FIG. 10A illustrates a conductive pattern panel according to an embodiment.

Figure 10B:
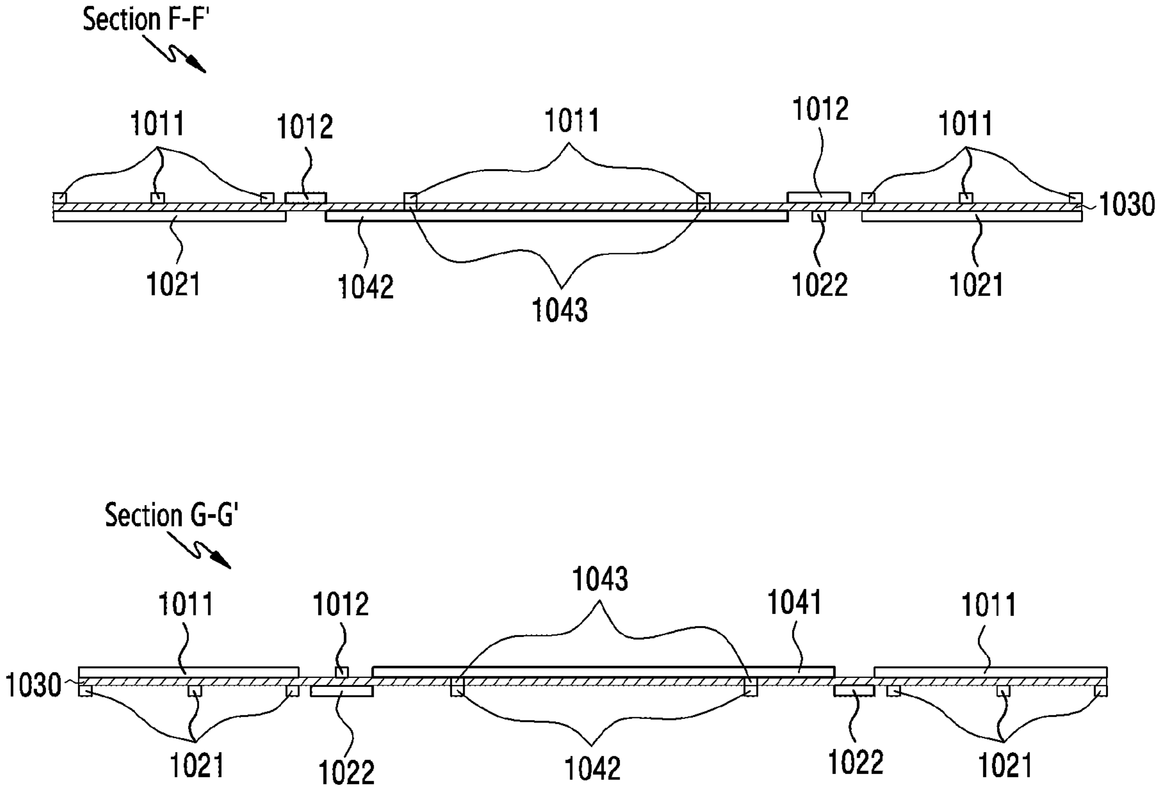
FIG. 10B illustrates a section F-F' and a section G-G' of FIG. 10A.

FIG. 10B illustrates a section F-F' and a section G-G' of FIG. 10A.

Figure 10C:
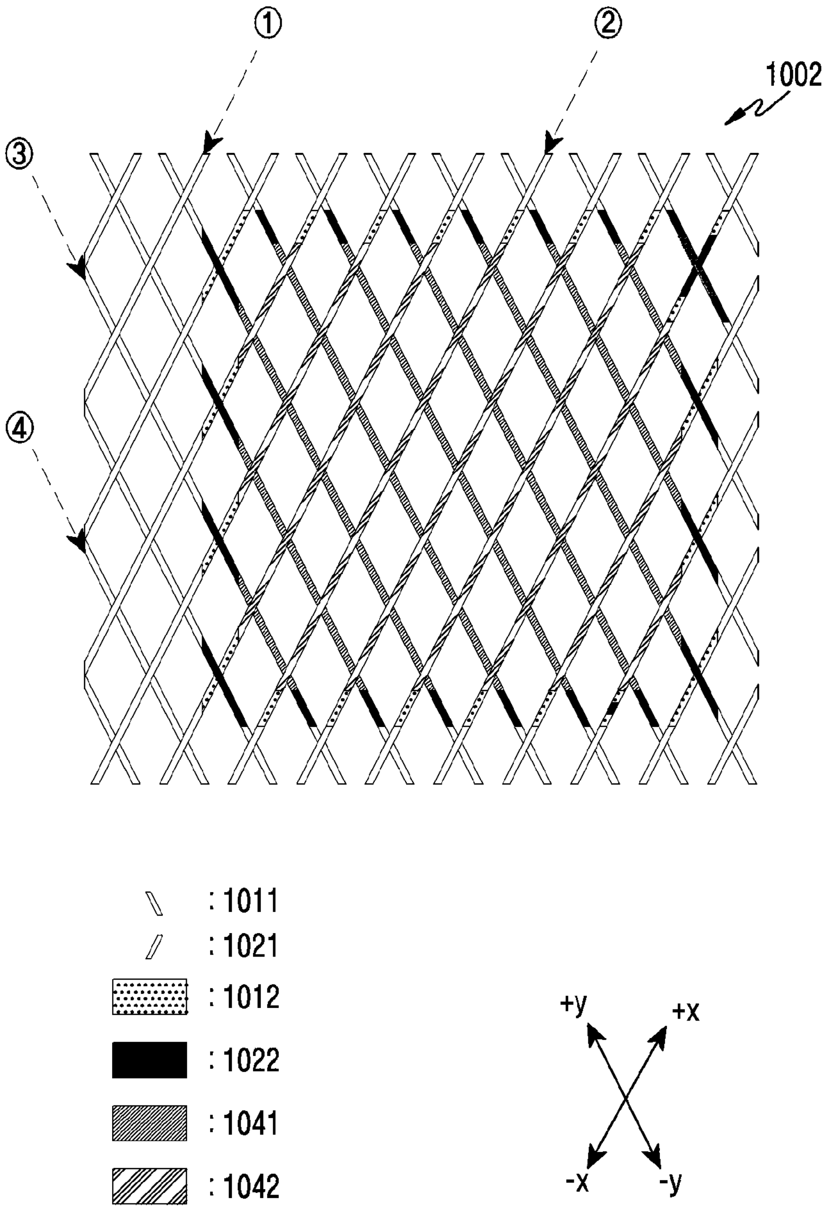
FIG. 10C is a plan view of a conductive pattern panel of FIG. 10A when viewed from the −z direction.

FIG. 10C is a plan view of the conductive pattern panel of FIG. 10A when viewed from the −z direction.

Figure 10D:
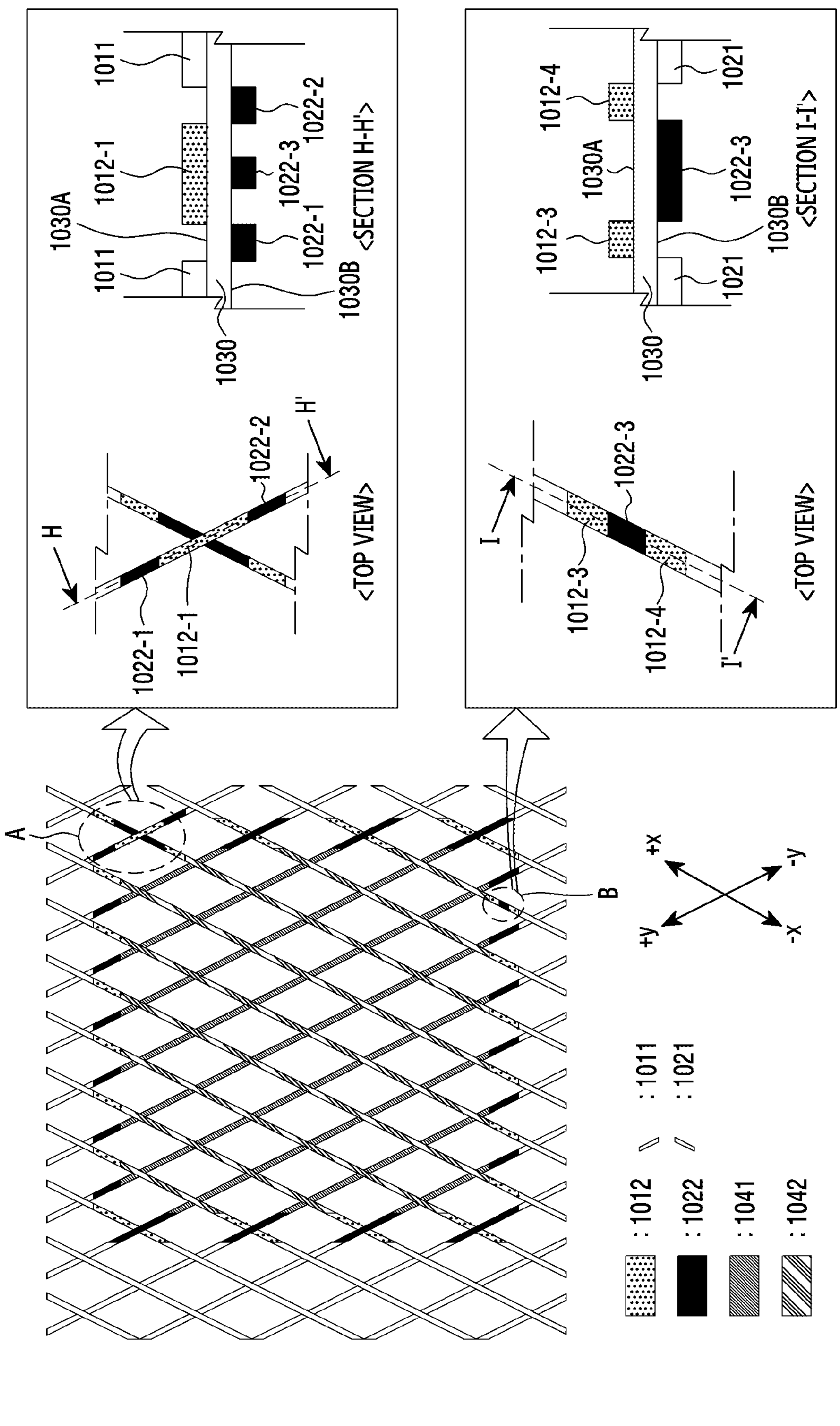
FIG. 10D illustrates a conductive pattern panel according to another example embodiment.

FIG. 10D illustrates a conductive pattern panel according to an embodiment.

A conductive pattern panel 1002 of FIG. 10A through FIG. 10C may correspond to the conductive pattern panel 302 of FIG. 3. In an embodiment, a first conductive pattern 1011, at least one first conductive line 1041, and a first dummy pattern 1012 may correspond to the first pattern portion 310 of FIG. 3. In an embodiment, a second conductive pattern 1021, at least one second conductive line 1042, and a second dummy pattern 1022 may correspond to the second pattern portion 320 of FIG. 3. In an embodiment, a dielectric layer 1030 may correspond to the dielectric layer 330 of FIG. 3.

Descriptions on the conductive pattern panel 1002, the first conductive pattern 1011, the second conductive pattern 1021, the first dummy pattern 1012, the second dummy pattern 1022, the antenna pattern 1040, and the dielectric layer 1030 provided with reference to FIG. 10A through FIG. 10C may adopt the descriptions on the conductive pattern panel 402, the first conductive pattern 411, the second conductive pattern 421, the first dummy pattern 412, the dummy pattern 422, the antenna pattern 440, and the dielectric layer 430 of FIG. 4A in a corresponding manner.

Referring to FIG. 10A, FIG. 10B, and FIG. 10C, the conductive pattern panel 1002 according to an embodiment may include at least one of the first conductive pattern 1011, the second conductive pattern 1021, the first dummy pattern 1012, the second dummy pattern 1022, and/or the dielectric layer 1030. The antenna pattern 1040 may be disposed on one region of the conductive pattern panel 1002.

In an embodiment, the first conductive pattern 1011 may be disposed on, directly or indirectly, a first surface 1030A of the dielectric layer 1030. The first conductive pattern 1011 may not be formed in a first designated region 1015 of the conductive pattern panel 1002. The first conductive pattern 1011 may, for example, extend in the y-axis direction and may be arranged at the third designated intervals D3 along the x-axis direction. The first conductive pattern 1011 may not be perpendicular to the second conductive pattern 1021.

In an embodiment, the first dummy pattern 1012 including a plurality of conductive lines may be disposed on, directly or indirectly, a first surface 1030A of the dielectric layer 1030, to surround the first designated region 1015. The plurality of the conductive lines of the first dummy pattern 1012 may extend in the x-axis direction, and may be arranged at the fourth designated intervals D4 along an edge of the first designated region 1015. For example, the fourth designated interval D4 may be substantially the same as the third designated interval D3, but may be different. The direction in which the plurality of the conductive lines of the first dummy pattern 1012 extend may be substantially the same as the second conductive pattern 1021. For example, the plurality of the conductive lines of the first dummy pattern 1012 may be substantially parallel to the second conductive pattern 1021.

In an embodiment, the first dummy pattern 1012 may be disposed between the second conductive line 1042 and the second conductive pattern 1021, such that the at least one second conductive line 1042 and the second conductive pattern 1021 do not appear separated when viewed from above the conductive pattern panel 1002 (e.g., when viewed from the −z direction).

In an embodiment, the second conductive pattern 1021 may be formed on a second surface 1030B of the dielectric layer 1030 facing away from the first surface 1030A of the dielectric layer 1030. The second conductive pattern 1021 may not be formed in a second designated region 1025 of the conductive pattern panel 1002. The second designated region 1025 may correspond to the first designated region 1015. For example, the second designated region 1025 may overlap the first designated region 1015, when viewed from the −z direction the conductive pattern panel 1002.

In an embodiment, the second conductive pattern 1021 may extend in the x-axis direction, and may be arranged at the fourth designated interval D4 along the y-axis. In an embodiment, the direction in which the second conductive pattern 1021 extends may be different from the direction in which the first conductive pattern 1011 extends. For example, the extending direction of the second conductive pattern 1021 may not be parallel to or perpendicular to the extending direction of the first conductive pattern 1011. The y axis and the x axis shown in FIG. 10A are to describe the extending directions of the first conductive pattern 1011 and the second conductive pattern 1021, and do not illustrate the orthogonal coordinates.

In an embodiment, the second dummy pattern 1022 including a plurality of conductive lines may be disposed on, directly or indirectly, a second surface 1030B of the dielectric layer 1030, to surround the second designated region 1025. The plurality of the conductive lines of the second dummy pattern 1022 may extend along the y-axis direction and may be arranged at the third designated intervals D3 along an edge of the second designated region 1025. The direction in which the plurality of the conductive lines of the second dummy pattern 1022 are arranged may be different from the second conductive pattern 1021. The direction in which the plurality of the conductive lines of the second dummy pattern 1022 extend may be substantially the same as the first conductive pattern 1011. For example, the plurality of the conductive lines of the second dummy pattern 1022 may be substantially parallel to the first conductive pattern 1011.

In an embodiment, the second dummy pattern 1022 may be disposed between the first conductive line 1041 and the first conductive pattern 1011, such that the at least one first conductive line 1041 and the first conductive pattern 1011 do not appear separated when viewed from above the conductive pattern panel 1002 (e.g., the −z direction).

In an embodiment, the antenna pattern 1040 may include the at least one first conductive line 1041, the at least one second conductive line 1042, and at least one conductive via 1043.

In an embodiment, the at least one first conductive line 1041 may be formed on a first surface 1030A of the dielectric layer 1030. The at least one first conductive line 1041 may be spaced apart from the first conductive pattern 1011, and may be disposed in a first designated region 1015 of the conductive pattern panel 1002. In an embodiment, the at least one first conductive line 1041 may extend in substantially the same direction as the first conductive pattern 1011. For example, the at least one first conductive line 1041 may be substantially parallel to the first conductive pattern 1011. If the at least one first conductive line 1041 is included in a plural number, the at least one first conductive line 1041 may be arranged at the third designated intervals D3 in substantially the same direction as the first conductive pattern 1011.

In an embodiment, the at least one second conductive line 1042 may be disposed on a second surface 1030B of the dielectric layer 1030. The at least one second conductive line 1042 may be spaced apart from the second conductive pattern 1021, and may be disposed in a second designated region 1025 of the conductive pattern panel 1002. In an embodiment, the at least one second conductive line 1042 may extend in substantially the same direction as the second conductive pattern 1021. For example, the at least one second conductive line 1042 may be substantially parallel to the second conductive pattern 1021. If the at least one second conductive line 1042 is included in a plural number, the at least one second conductive line 1042 may be arranged at the fourth designated intervals D4 in substantially the same direction as the second conductive pattern 1021.

In an embodiment, the at least one conductive via 1043 may be connected to the at least one first conductive line 1041 and the at least one second conductive line 1042. The at least one conductive via 1043 may be disposed at a position where the at least one first conductive line 1041 and the at least one second conductive line 1042 overlap, when viewed from above the antenna pattern (e.g., when viewed from the −z direction).

In an embodiment, even if the antenna pattern 1040 is disposed on the conductive pattern panel 1002, the first and second conductive patterns 1011 and 1021 or the antenna pattern 1040 of the conductive pattern panel 1002 may not be visible to the user. For example, referring to FIG. 10C, since the antenna pattern 1040 is formed in substantially the same pattern as the first and second conductive patterns 1011 and 1021, and the first and second dummy patterns 1012 and 1022 are disposed in a space between the antenna pattern 1040 and the first and second conductive patterns 1011 and 1021, the conductive pattern panel 1002 may appear in a uniform pattern on the whole. For example, referring to FIG. 10C, when viewed from above the conductive pattern panel 1002 (e.g., when viewed from the −z direction of FIG. 10A), the conductive pattern panel 1002 may appear in a uniform mesh pattern on the whole. The pattern of the conductive pattern panel 1002 may appear to include a first pattern extending along the y axis and a second pattern extending along the x axis. The first pattern and the second pattern may appear as a pattern having a parallelogram shape.

In an embodiment, when viewed from above the conductive pattern panel 1002 (e.g., when viewed from the −z direction of FIG. 10A), a diagonal line ① of the second pattern may be formed by the second conductive pattern 1021. In an embodiment, when viewed from above the conductive pattern panel 1002, a diagonal line ② of the second pattern may be formed by the second conductive pattern 1021, the first dummy pattern 1012, and the at least one second conductive line 1042. In an embodiment, when viewed from above the conductive pattern panel 1002, an oblique line ③ of the first pattern may be formed by the first conductive pattern 1011, the second dummy pattern 1022, and the at least one first conductive line 1041. In an embodiment, when viewed from above the conductive pattern panel 1002, a diagonal line ④ of the first pattern may be formed by the first conductive pattern 1011. Although the antenna pattern 1040 is disposed on, directly or indirectly, the conductive pattern panel 1002, the first conductive pattern 1011 and/or the antenna pattern 1040 of the conductive pattern panel 1002 may not be visible to the user, because the conductive pattern panel 1002 appear as the uniform pattern on the whole.

In an embodiment, the first dummy pattern 1012 and/or the second dummy pattern 1022 of the conductive pattern panel 1002 may allow various design modifications. For example, referring to FIG. 10D, the first dummy pattern 1012 and/or the second dummy pattern 1022 may be divided into at least two portions. For example, referring to a region A of FIG. 10D, the first dummy pattern 1012 may include a first portion 1012-1, a second portion 1012-2 or a third portion 1012-3. The second dummy pattern 1022 may include a first portion 1022-1, a second portion 1022-2 or a third portion 1022-3. The first portion 1022-1 and the second portion 1022-2 may be disposed on, directly or indirectly, the second surface 1030B of the dielectric layer 1030, and may be spaced apart from each other. When viewed from above the conductive pattern panel 1002, the first portion 1012-1 of the first dummy pattern 1012 may be disposed on, directly or indirectly, the first surface 1030A of the dielectric layer 1030 between at least the first portion 1022-1 and the second portion 1022 of the second dummy pattern 1022. The first portion 1012-1 of the first dummy pattern 1012, and the first portion 1022-1 and the second portion 1022-2 of the second dummy pattern 1022 may be arranged such that the pattern of the conductive pattern panel 1002 extends without being disconnected, when viewed from above the conductive pattern panel 1002. As another example, referring to a region B of FIG. 10D, the second portion 1012-3 and the third portion 1012-4 of the first dummy pattern 1012 may be disposed on, directly or indirectly, the first surface 1030A of the dielectric layer 1030, and may be spaced apart from each other. When viewed from above the conductive pattern panel 1002, the third portion 1022-3 of the second dummy pattern 1022 may be disposed on, directly or indirectly, the second surface 1030B of the dielectric layer 1030, between at least the second portion 1012-3 and the third portion 1012-4 of the first dummy pattern 1012. The third portion 1022-3 of the second dummy pattern 1022 may be disposed to appear as extending a portion separated from the second portion 1012-3 and the third portion 1012-4 of the first dummy pattern 1012. The first dummy pattern 1012 and/or the second dummy pattern 1022, which are divided into at least two portions, may appear as a single diagonal line extending without being disconnected, when viewed from above the conductive pattern panel 1002.

Figure 11:
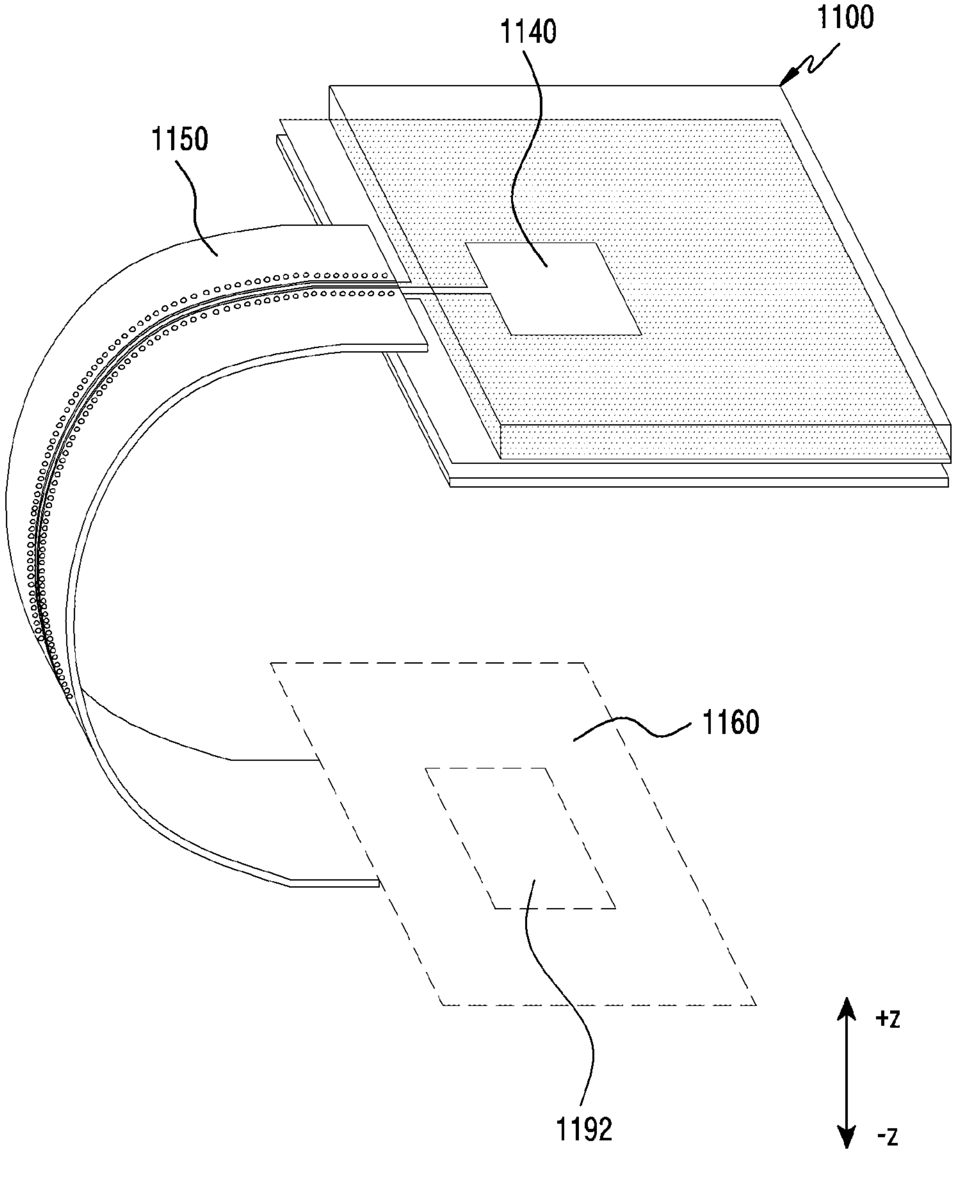
FIG. 11 illustrates an electronic device according to an example embodiment.

FIG. 11 illustrates an electronic device according to an embodiment.

Referring to FIG. 11, an electronic device 1101 (e.g., the electronic device 101 of FIG. 1) according to an embodiment may include a display 1100, a flexible printed circuit board (FPCB) 1150, a radio frequency integrated circuit (RFIC) 1192 (or a wireless communication circuitry 1192 (e.g., the wireless communication module 192 of FIG. 1 comprising communication circuitry)) and/or a printed circuit board 1160.

In an embodiment, the display 1100 (e.g., the display 300 of FIG. 3) may include an antenna pattern 1140 formed on a conductive pattern panel. The antenna pattern 1140 may correspond to the antenna pattern 440 of FIG. 4A through FIG. 4C, the antenna pattern 640 of FIG. 6A through FIG. 6C, the antenna pattern 940 of FIG. 9A through FIG. 9C, or the antenna pattern 1040 of FIG. 10A through FIG. 10C.

In an embodiment, the printed circuit board 1160 may be disposed under the display 1100 (e.g., the −z direction).

In an embodiment, the FPCB 1150 may be connected to one side of the display 1100, and may be electrically connected with the antenna pattern 1140.

In an embodiment, the FPCB 1150 may extend from the display 1100 toward the printed circuit board 1160, while bending. The FPCB 1150 may be connected to the printed circuit board 1160.

In an embodiment, the RFIC 1192 may be disposed on, directly or indirectly, the printed circuit board 1160. The RFIC 1192 may be electrically connected to the antenna pattern 1140 through the FPCB 1150. For example, the RFIC 1192 may feed the antenna pattern 1140 through a transmission line (e.g., microstrip) provided by the FPCB 1150. In an embodiment, the RFIC 1192 may be electrically connected to the antenna pattern 1140 through another electrical connection member, for example, a coaxial cable or a probe. In an embodiment, a processor (e.g., 120 in FIG. 1) of the electronic device 1100 may transmit or receive an RF signal (e.g., a mmWave signal) of a designated band through the antenna pattern 1140, using the RFIC 1192.

Figure 12:
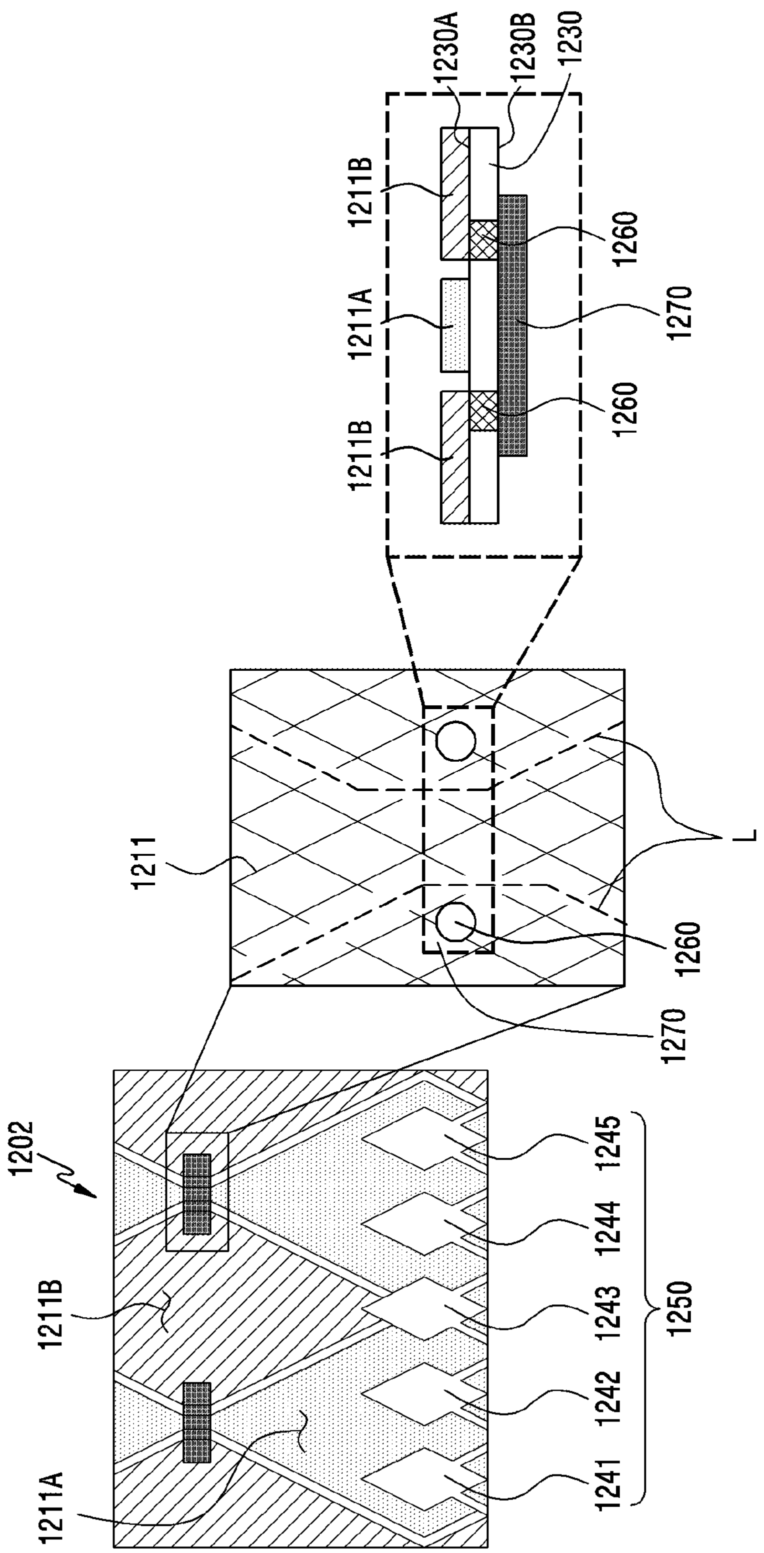
FIG. 12 illustrates a conductive pattern panel according to an example embodiment.

FIG. 12 illustrates a conductive pattern panel according to an embodiment.

Referring to FIG. 12, a conductive pattern panel 1202 of FIG. 12 may include a conductive pattern 1211, a dielectric layer 1230, an array antenna 1250, a conductive via 1260, and/or a connection member 1270.

In an embodiment, the conductive pattern 1211 may be disposed on, directly or indirectly, a first surface 1230A of the dielectric layer 1230. The conductive pattern 1211 of FIG. 12 may correspond to the first conductive pattern 911 of FIG. 9A. For example, the conductive pattern 1211 may form a mesh pattern, substantially in the same manner as the first conductive pattern 911 of FIG. 9A.

In an embodiment, the conductive pattern 1211 may be physically divided based on a dotted line L. The conductive pattern 1211 may include a first pattern region 1211A and a second pattern region 1211B separated from each other based on the dotted line L.

In an embodiment, the first pattern region 1211A may be included in a plural number on the conductive pattern panel 1202, and the first pattern regions 1211A forming one column along the y axis may be electrically connected to each other. The second pattern region 1211B may be divided by the first pattern region 1211A. In an embodiment, the second pattern region 1211B may be included in a plural number on the conductive pattern panel 1202, and the second pattern regions 1211B forming one row along the x axis may be electrically connected to each other through a connection member 1270.

In an embodiment, the dielectric layer 1230 may be disposed between at least the conductive pattern 1211 and the connection member 1270. In an embodiment, the dielectric layer 1230 may correspond to the dielectric layer 930 of FIG. 9A.

In an embodiment, the connection member 1270 may be disposed on a second surface 1230B of the dielectric layer 1230. The connection member 1270 may extend along the x-axis direction. The connection member 1270 may include a conductive material.

In an embodiment, the conductive via 1270 may be formed in the dielectric layer 1230. The conductive via 1270 may pass through or penetrate the dielectric layer 1230. One end of the conductive via 1270 may be connected, directly or indirectly, to the conductive pattern 1211 of the second pattern region 1211B, and the other end may be connected, directly or indirectly, to the connection member 1270.

In an embodiment, the conductive pattern 1211 of the second pattern region 1211B, divided by the first pattern region 1211A, may electrically connect the second pattern regions 1211B forming one row along the x axis, through the conductive via 1260 and the connection member 1270. The row formed by the second pattern regions 1211B along the x axis may be plural.

In an embodiment, the conductive pattern 1211 of the first pattern region 1211A may be operated as a first electrode pattern for detecting a touch input and/or obtaining fingerprint information, and the conductive pattern 1211 of the second pattern region 1211B may be operated as a second electrode pattern for detecting a touch input and/or obtaining fingerprint information. The electronic device 101 according to an embodiment may detect the touch input on conductive pattern panel 1202, using the conductive pattern 1211 of the first pattern region 1211A and the conductive pattern 1211 of the second pattern region 1211B. The electronic device 101 according to an embodiment may obtain information of a user's fingerprint contacting the conductive pattern panel 1202, using the conductive pattern 1211 of the first pattern region 1211A and the conductive pattern 1211 of the second pattern region 1211B.

In an embodiment, the array antenna 1250 may be disposed on, directly or indirectly, the first surface 1230A and/or the second surface 1230B of the dielectric layer 1230. In an embodiment, the conductive pattern 1211 may not be formed in a region overlapping the array antenna 1250 in the first surface 1230A of the dielectric layer 1230.

In an embodiment, the array antenna 1250 may include at least two or more of a first antenna pattern 1241, a second antenna pattern 1242, a third antenna pattern 1243, a fourth antenna pattern 1244, and/or a fifth antenna pattern 1245. In an embodiment, at least one of the first antenna pattern 1241, the second antenna pattern 1242, the third antenna pattern 1243, the fourth antenna pattern 1244, and/or the fifth antenna pattern 1245 may correspond to the antenna pattern 940 of FIG. 9A. In an embodiment, at least one of the first antenna pattern 1241, the second antenna pattern 1242, the third antenna pattern 1243, the fourth antenna pattern 1244, and/or the fifth antenna pattern 1245 may correspond to the antenna pattern 1040 of FIG. 10.

The electronic device 101 according to an embodiment may transmit or receive an RF signal (e.g., a mmWave signal) of a designated band, using the array antenna 1250.

An electronic device (e.g., the electronic device 101 of FIG. 1) according to an embodiment may include a display panel (e.g., the display panel 303 of FIG. 3), a conductive pattern panel (e.g., the conductive pattern panel 302 of FIG. 3) disposed on, directly or indirectly, the display panel—the conductive pattern panel including a dielectric layer (e.g., the dielectric layer 330 of FIG. 3), a first conductive pattern (e.g., the first pattern portion 310 of FIG. 3) disposed on, directly or indirectly, a first surface of the dielectric layer, and including a plurality of first conductive members, and a second conductive pattern (e.g., the second pattern portion 320 of FIG. 3) disposed on, directly or indirectly, a second surface opposite to the first surface of the dielectric layer, and including a plurality of second conductive members, wherein the conductive pattern panel includes a first region and a second region (e.g., the first designated region 415 and the second designated region 425 of FIG. 4A), and the first conductive pattern and the second conductive pattern are disposed in the first region—, an antenna pattern (e.g., the antenna pattern 440 of FIG. 4A) formed in the second region of the conductive pattern panel—the antenna pattern including at least one first conductive line (e.g., the first conductive line 441 of FIG. 4A) disposed to be substantially parallel to the plurality of the first conductive members of the first conductive pattern on, directly or indirectly, the first surface of the dielectric layer, at least one second conductive line (e.g., the second conductive line 442 of FIG. 4A) disposed to be substantially parallel to the plurality of the second conductive members of the second conductive pattern on the second surface of the dielectric layer, and at least one conductive via (e.g., the at least one conductive via 443 of FIG. 4A) electrically connecting, directly or indirectly, the at least one first conductive line and the at least one second conductive line and passing through the dielectric layer—, a first dummy pattern (e.g., the first dummy pattern 412 of FIG. 4A) including a plurality of conductive lines—the first dummy pattern being disposed on, directly or indirectly, the first surface of the dielectric layer, disposed between the at least one first conductive line and the plurality of the first conductive members, and substantially parallel to the plurality of the second conductive members—, a wireless communication circuit (e.g., the wireless communication circuit 192 of FIG. 1) electrically connected, directly or indirectly, to the antenna pattern, and at least one processor (e.g., the processor 120 of FIG. 1) electrically connected, directly or indirectly, to the display panel, the conductive pattern panel, and the wireless communication circuit, and the at least one processor may be configured to receive an RF signal using the antenna pattern and the wireless communication circuit.

In an embodiment, the at least one first conductive line may be spaced apart from the first conductive pattern.

In an embodiment, the plurality of the conductive lines of the first dummy pattern may be disposed to cover at least in part a space between the at least one second conductive line and the second conductive pattern when viewed from above the conductive pattern panel.

In an embodiment, a shape of the plurality of the conductive lines of the first dummy pattern may include at least one of an ellipse (e.g., the dummy pattern 701 of FIG. 1), a hexagon (e.g., the dummy pattern 702 of FIG. 1), a pentagon (e.g., the dummy pattern 703 of FIG. 1), a trapezoidal quadrangle (e.g., the dummy pattern 704 of FIG. 1), and a parallelogram (e.g., the dummy pattern 706 of FIG. 1).

In an embodiment, the plurality of the conductive lines of the first dummy pattern may overlap at least one of the plurality of the first conductive members and the at least one first conductive line.

The electronic device according to an embodiment may include a second dummy pattern (e.g., the second dummy pattern 422 of FIG. 4A) including a plurality of conductive lines, the at least one second conductive line may be spaced apart from the second conductive pattern, and the second dummy pattern may be disposed on the second surface of the dielectric layer, disposed between the at least one second conductive line and the second conductive pattern, parallel to the plurality of the first conductive members of the first conductive pattern, and disposed to cover at least in part a space between the at least one first conductive line and the first conductive pattern when viewed from above the conductive pattern panel.

In an embodiment, the second dummy pattern may be thicker than the first dummy pattern.

In an embodiment, the second region may include a first edge, a second edge opposite to the first edge, a third edge connected to one end of the first edge and one end of the second edge, and a fourth edge connected to the other end of the first edge and the other edge of the second edge, the plurality of the conductive lines of the first dummy pattern may be disposed on the first edge and the second edge of the second region, and the plurality of the conductive lines of the second dummy pattern may be disposed on the third edge and the fourth edge of the second region.

In an embodiment, the plurality of the first conductive members of the first conductive pattern may be substantially perpendicular to the plurality of the second conductive members of the second conductive pattern.

In an embodiment, the conductive pattern panel may include a mesh pattern formed by the first conductive pattern, the second conductive pattern, the at least one first conductive line, and the at least one second conductive line.

In an embodiment, the mesh pattern may be formed in a rectangle, a parallelogram or a rhombus.

In an embodiment, the antenna pattern and the wireless communication circuit may be electrically connected, directly or indirectly, through an FPCB.

In an embodiment, the at least one processor (comprising processing circuitry) may be configured to detect a touch input on the conductive pattern panel, using at least a part of the first conductive pattern and the second conductive pattern, while receiving an RF signal using the wireless communication circuit.

In an embodiment, the wireless communication circuit may include an RFIC (e.g., the RFIC 1192 of FIG. 11), and the RF signal may include a mmWave signal.

In an embodiment, the first conductive pattern and the second conductive pattern may not be disposed in the second region.

An electronic device according to an embodiment may include a display panel (e.g., the display panel 303 of FIG. 3), a conductive pattern panel (e.g., the conductive pattern panel 302 of FIG. 3) disposed on, directly or indirectly, the display panel—the conductive pattern panel including a dielectric layer (e.g., the dielectric layer 330 of FIG. 3), a first conductive pattern (e.g., the first pattern portion 310 of FIG. 3) including a plurality of first conductive members disposed on, directly or indirectly, a first surface of the dielectric layer, and a second conductive pattern (e.g., the second pattern portion 320 of FIG. 3) including a plurality of second conductive members disposed, directly or indirectly, on a second surface opposite to the first surface of the dielectric layer, and the conductive pattern panel including a designated region (e.g., the first designated region 415 and the second designated region 425 of FIG. 4) in which the first conductive pattern and the second conductive pattern are not disposed—, an antenna pattern (e.g., the antenna pattern 440 of FIG. 4A) formed in the designated region of the conductive pattern panel—the antenna pattern including at least one first conductive line (e.g., the first conductive line 441 of FIG. 4A) disposed to be substantially parallel to the plurality of the first conductive members on the second surface of the dielectric layer, and at least one second conductive line (e.g., the second conductive line 442 of FIG. 4A) disposed to be substantially parallel to the plurality of the second conductive members on the second surface of the dielectric layer—, an RFIC (e.g., the wireless communication module 192 of FIG. 1, comprising communication circuitry) electrically connected, directly or indirectly, to the antenna pattern, and at least one processor (e.g., the processor 120 of FIG. 1, comprising processing circuitry) electrically connected to the display panel, the conductive pattern panel, and the RFIC, and the at least one processor may be configured to receive a mmWave signal using the antenna pattern and the RFIC.

In an embodiment, the at least one first conductive line and the at least one second conductive line may be spaced apart from the second conductive pattern.

In an embodiment, a first dummy pattern (e.g., the first dummy pattern 412 of FIG. 4A) including a plurality of conductive lines may be included, and the first dummy pattern may be disposed on, directly or indirectly, the first surface of the dielectric layer, and substantially parallel to the plurality of the second conductive lines of the second conductive pattern, in the designated region.

In an embodiment, the conductive pattern panel may include a mech pattern formed by the first conductive pattern, the second conductive pattern, the at least one first conductive line, the at least one second conductive line, and the first dummy pattern.

In an embodiment, the plurality of the conductive lines of the first dummy pattern may be disposed to cover at least in part a space between at least the at least one second conductive line and the second conductive pattern when viewed from the conductive pattern panel, the designated region may include a first edge, a second edge opposite to the first edge, a third edge connected to one end of the first edge and one end of the second edge, and a fourth edge connected to the other end of the first edge and the other edge of the second edge, the plurality of the conductive lines of the first dummy pattern may be disposed on, directly or indirectly, the first edge and the second edge of the second region, and the plurality of the conductive member of the first conductive pattern may be substantially perpendicular to the plurality of the second conductive members of the second conductive pattern.

Effects obtainable are not limited to the above-mentioned effects, and other effects which are not mentioned may be clearly understood by those skilled in the art through the following descriptions.

The methods according to the embodiments described in the claims or the specification may be implemented in software, hardware, or a combination of hardware and software.

As for the software, a computer-readable storage medium storing one or more programs (software modules) may be provided. One or more programs stored in the computer-readable storage medium may be configured for execution by one or more processors of an electronic device. One or more programs may include instructions for controlling the electronic device to execute the methods according to the embodiments described in the claims or the specification of the present disclosure.

Such a program (software module, software) may be stored to a random access memory, a non-volatile memory including a flash memory, a read only memory (ROM), an electrically erasable programmable ROM (EEPROM), a magnetic disc storage device, a compact disc (CD)-ROM, digital versatile discs (DVDs) or other optical storage devices, and a magnetic cassette. Alternatively, it may be stored to a memory combining part or all of those recording media. In addition, a plurality of memories may be included.

Also, the program may be stored in an attachable storage device accessible via a communication network such as Internet, Intranet, local area network (LAN), wide LAN (WLAN), or storage area network (SAN), or a communication network by combining these networks. Such a storage device may access a device which executes an embodiment of the present disclosure through an external port. In addition, a separate storage device on the communication network may access the device which executes an embodiment.

The elements included in the present disclosure are expressed in a singular or plural form. However, the singular or plural expression is appropriately selected according to a proposed situation for the convenience of explanation, the present disclosure is not limited to a single element or a plurality of elements, the elements expressed in the plural form may be configured as a single element, and the elements expressed in the singular form may be configured as a plurality of elements.

Meanwhile, while the specific embodiment has been described in the explanations of the present disclosure, it will be noted that various changes may be made therein without departing from the scope of the present disclosure. Therefore, the scope of the present disclosure is not limited and defined by the described embodiment and is defined not only the scope of the claims as below but also their equivalents. While the disclosure has been illustrated and described with reference to various embodiments, it will be understood that the various embodiments are intended to be illustrative, not limiting. It will further be understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

The invention claimed is:

1. An electronic device comprising:

a display panel;

a conductive pattern panel disposed on the display panel, the conductive pattern panel comprising:

a dielectric layer, a first conductive pattern disposed on a first surface of the dielectric layer, and comprising a plurality of first conductive members comprising conductive material, and a second conductive pattern disposed on a second surface, opposite to the first surface, of the dielectric layer, the second conducive pattern comprising a plurality of second conductive members comprising conductive material, wherein the conductive pattern panel comprises a first region and a second region, and wherein the first conductive pattern and the second conductive pattern are disposed in the first region;

an antenna pattern formed at least partially in the second region of the conductive pattern panel, the antenna pattern comprising:

at least one first conductive line disposed to be substantially parallel to the plurality of the first conductive members of the first conductive pattern on the first surface of the dielectric layer, at least one second conductive line disposed to be substantially parallel to the plurality of the second conductive members of the second conductive pattern on the second surface of the dielectric layer, and at least one conductive via electrically connecting the at least one first conductive line and the at least one second conductive line and passing through the dielectric layer;

a first dummy pattern comprising a plurality of conductive lines, the first dummy pattern being:

disposed on the first surface of the dielectric layer, disposed between the at least one first conductive line and the plurality of the first conductive members, and substantially parallel to the plurality of the second conductive members;

a wireless communication circuit electrically connected to the antenna pattern; and at least one processor electrically connected to the display panel, the conductive pattern panel, and the wireless communication circuit, the at least one processor configured to receive a radio frequency (RF) signal using at least the antenna pattern and the wireless communication circuit.

2. The electronic device of claim 1, wherein the at least one first conductive line is spaced apart from the first conductive pattern.

3. The electronic device of claim 1, wherein the plurality of conductive lines of the first dummy pattern is disposed to cover at least in part a space between the at least one second conductive line and the second conductive pattern as viewed from above the conductive pattern panel.

4. The electronic device of claim 1, wherein a shape of the plurality of conductive lines of the first dummy pattern comprises at least one of an ellipse, a hexagon, a pentagon, a trapezoidal quadrangle, or a parallelogram.

5. The electronic device of claim 1, wherein the plurality of conductive lines of the first dummy pattern overlap at least one of the plurality of the first conductive members and the at least one first conductive line.

6. The electronic device of claim 1, comprising:

a second dummy pattern comprising a plurality of conductive lines, wherein the at least one second conductive line is spaced apart from the second conductive pattern, and wherein the second dummy pattern is:

disposed on the second surface of the dielectric layer, disposed between at least the at least one second conductive line and the second conductive pattern, substantially parallel to the plurality of the first conductive members of the first conductive pattern, and disposed to cover at least in part a space between the at least one first conductive line and the first conductive pattern when viewed from above the conductive pattern panel.

7. The electronic device of claim 6, wherein the second dummy pattern is thicker than the first dummy pattern.

8. The electronic device of claim 6, wherein the second region comprises a first edge, a second edge opposite to the first edge, a third edge connected to one end of the first edge and one end of the second edge, and a fourth edge connected to the other end of the first edge and the other edge of the second edge, wherein the plurality of conductive lines of the first dummy pattern is disposed on the first edge and the second edge of the second region, and wherein the plurality of conductive lines of the second dummy pattern is disposed on the third edge and the fourth edge of the second region.

9. The electronic device of claim 1, wherein the plurality of the first conductive members of the first conductive pattern is substantially perpendicular to the plurality of the second conductive members of the second conductive pattern.

10. The electronic device of claim 1, wherein the conductive pattern panel comprises a mesh pattern formed by the first conductive pattern, the second conductive pattern, the at least one first conductive line, and the at least one second conductive line.

11. The electronic device of claim 10, wherein the mesh pattern is formed in a rectangle, a parallelogram or a rhombus.

12. The electronic device of claim 1, wherein the antenna pattern and the wireless communication circuit are electrically connected through at least a flexible printed circuit board (FPCB).

13. The electronic device of claim 1, wherein the at least one processor is configured to detect a touch input on the conductive pattern panel, using at least a part of the first conductive pattern and the second conductive pattern, while receiving an RF signal using the wireless communication circuit.

14. The electronic device of claim 1, wherein the wireless communication circuit comprises a radio frequency integrated circuitry (RFIC), and wherein the RF signal comprises a millimeter wave (mmWave) signal.

15. The electronic device of claim 1, wherein the first conductive pattern and the second conductive pattern are not disposed in the second region.

16. An electronic device comprising:

a display panel;

a conductive pattern panel disposed on the display panel, wherein the conductive pattern panel includes:

a dielectric layer, a first conductive pattern including a plurality of first conductive members disposed on a first surface of the dielectric layer, and a second conductive pattern including a plurality of second conductive members disposed on a second surface opposite to the first surface of the dielectric layer, wherein the conductive pattern panel includes a designated region in which the first conductive pattern and the second conductive pattern are not disposed;

an antenna pattern formed in the designated region of the conductive pattern panel, wherein the antenna pattern includes:

at least one first conductive line disposed to be substantially parallel to the plurality of the first conductive members on the second surface of the dielectric layer, and at least one second conductive line disposed to be substantially parallel to the plurality of the second conductive members on the second surface of the dielectric layer, an radio frequency integrated circuit (RFIC) electrically connected to the antenna pattern, and at least one processor electrically connected to the display panel, the conductive pattern panel, and the RFIC, wherein the at least one processor may be configured to receive a millimeter weave (mmWave) signal using at least the antenna pattern and the RFIC.

17. The electronic device of claim 16, wherein the at least one first conductive line is spaced apart from the first conductive pattern.

18. The electronic device of claim 16, wherein the plurality of conductive lines of the first dummy pattern is disposed to cover at least in part a space between the at least one second conductive line and the second conductive pattern as viewed from above the conductive pattern panel.

19. The electronic device of claim 16, wherein a shape of the plurality of conductive lines of the first dummy pattern comprises at least one of an ellipse, a hexagon, a pentagon, a trapezoidal quadrangle, or a parallelogram.

20. The electronic device of claim 16, wherein the plurality of the conductive lines of the first dummy pattern overlap at least one of the plurality of the first conductive members and the at least one first conductive line.

* * * * *